US008643857B2

(12) United States Patent
Ikeda

(10) Patent No.: US 8,643,857 B2
(45) Date of Patent: Feb. 4, 2014

(54) IMAGE PROCESSING APPARATUS, IMAGE PROCESSING METHOD, AND PROGRAM AND STORAGE MEDIUM THEREFOR

(75) Inventor: Sanae Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 12/760,056

(22) Filed: Apr. 14, 2010

(65) Prior Publication Data
US 2010/0265545 A1  Oct. 21, 2010

(30) Foreign Application Priority Data

Apr. 16, 2009 (JP) .................................. 2009-100190
Apr. 9, 2010 (JP) .................................. 2010-090410

(51) Int. Cl.
*G06K 15/00* (2006.01)

(52) U.S. Cl.
USPC ....... 358/1.13; 358/1.15; 358/1.16; 358/1.18; 358/1.1; 358/1.9; 358/2.1; 358/538; 358/537; 358/453; 715/788

(58) Field of Classification Search
USPC ........... 358/1.11–1.18, 1.9, 1.1, 2.1; 382/165, 382/218, 219, 224–226, 228, 284, 294; 348/231.9; 715/255; 345/660
See application file for complete search history.

(56) References Cited

U.S. PATENT DOCUMENTS

| 7,156,291 | B2 | 1/2007 | Ikeda | 235/375 |
| 7,538,904 | B2 | 5/2009 | Ikeda et al. | 358/1.18 |
| 7,594,115 | B2 | 9/2009 | Ikeda | 713/170 |
| 2008/0043281 | A1* | 2/2008 | Kato et al. | 358/1.15 |
| 2009/0168089 | A1* | 7/2009 | Hachiro | 358/1.13 |
| 2010/0215279 | A1* | 8/2010 | Gao et al. | 382/224 |

FOREIGN PATENT DOCUMENTS

JP  11321015 A  * 11/1999
JP  2002-149153  5/2002

* cited by examiner

*Primary Examiner* — Chad Dickerson
(74) *Attorney, Agent, or Firm* — Fitzpatrick, Cella, Harper & Scinto

(57) ABSTRACT

The objective of the present invention is to provide an image processing apparatus that can perform selective processing for a plurality of images stored in a multi-image file. To achieve this objective, the image processing apparatus according to the present invention includes a designation unit for designating an image file; a determination unit for determining whether the file designated by the designation unit is a multi-image file; an image information analyzing unit for analyzing image information, stored in the image file designated by the designation unit, when the designated image file is determined to be a multi-image file; a switching unit for switching between user selection and automatic selection of a multi-image file image to be output target; an image information notification unit; an output range designation unit; an output form designation unit; and an output unit.

4 Claims, 39 Drawing Sheets

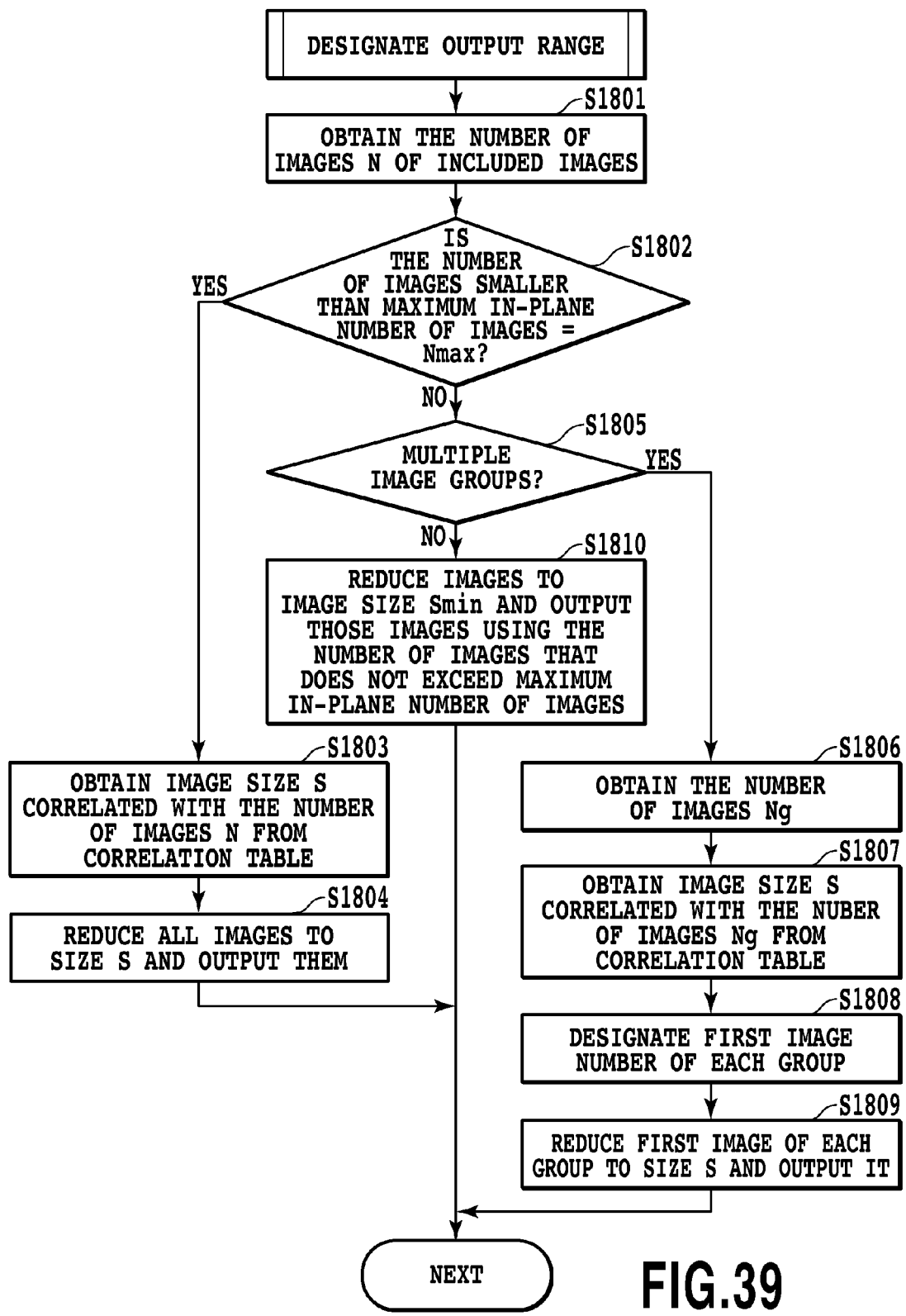

IMAGE PROCESSING APPARATUS, IMAGE PROCESSING METHOD, AND PROGRAM AND STORAGE MEDIUM THEREFOR

BACKGROUND OF THE INVENTION

1. Field of the Invention

The present invention relates to an image processing apparatus, an image processing method, and a program and a storage medium therefor.

2. Description of the Related Art

Conventionally, a printer, a copier, a facsimile machine and a multifunction peripheral, which incorporates the functions of some or all of the other apparatuses, are known as image processing apparatuses, each of which includes an image input/output mechanism.

Such an image processing apparatus employs, as input data, data received from an externally connected host computer, data read by the image reader included in the image processing apparatus, and data stored in a portable storage medium. These input data are stored in a program storage medium provided for the image processing apparatus, and are then processed by the controller of the image processing apparatus, employing a program supplied for the purpose. The thus processed data are then output by the output unit included in the image processing apparatus. The processed data are transmitted to the external output device, or are also stored in the storage medium. The image processing apparatus performs this processing sequence in accordance with a user issued output instruction.

Recently, a multi-image file format, which uses a single file to hold multiple image data, has come to be employed as an image data format for the image processing apparatus. According to this format, a single file internally includes a hierarchical structure in which a plurality of images are stored along with associated information. These internally stored images consist either of a main image, which represents a file, and one or more sub images, or of all images that are stored in the file, which have the same hierarchical rank.

For example, according to the description given in Japanese Patent Laid-Open No. 2002-149153, images having multiple resolutions are stored in a single file, and an image to be displayed is selected in consequence with an area in a display device in which the image is to be displayed.

In the conventional art, when an image file prepared using such a multi-image file format is output, either only the main image or an equivalent image, or all the images stored in the multi-image file are selected as output target.

Therefore, since in appearance an image file created using a multi-image file format is a single file, a user issuing a data output instruction for such an image file will be unable to ascertain whether the image file to be output is one prepared using a normal format (only a single image) or one prepared using a multi-image file format.

Thus, when a main image or an equivalent image is selected as output target during an output process in the conventional manner, a user will not know what other images are included in the multi-image file.

Furthermore, when output processing is to be performed for a multi-image file and all images stored therein are selected as output target, neither the image type to be output nor the number of images will be obvious to a user.

As described above, since a user can not identify the images stored in an image file prepared using the multi-image file format, the user can not perform the output process as prescribed.

While taking this problem into account, one objective of the present invention is to provide selective processing to be performed for a plurality of images stored in a multi-image file.

SUMMARY OF THE INVENTION

To achieve the objective, an image processing apparatus according to the present invention includes: a designation unit for designating an image file; a determination unit for determining whether the file designated by the designation unit is a multi-image file; an image information analyzing unit for analyzing image information, stored in the image file designated by the designation unit, when the designated image file is determined to be a multi-image file; a switching unit for switching between user selection and automatic selection of a multi-image file image to be output target; an image information notification unit for giving notice of the image information that has been analyzed by the image information analyzing unit; an output range designation unit for designating, based on the image information given by the image information notification unit, an output range of a image to be output target; an output form designation unit for designating, based on the image information given by the image information notification unit, an output form of a image to be output target; and an output unit for outputting a image to be output target based on the output form designated by the output form designation unit, within the output range designated by the output range designation unit.

According to the present invention, a plurality of images in a multi-image file can be selectively processed.

Further features of the present invention will become apparent from the following description of exemplary embodiments (with reference to the attached drawings).

BRIEF DESCRIPTION OF THE DRAWINGS

FIG. 39 is a flowchart showing the processing performed for third embodiments of the present invention.

DESCRIPTION OF THE EMBODIMENTS

Figure 1:
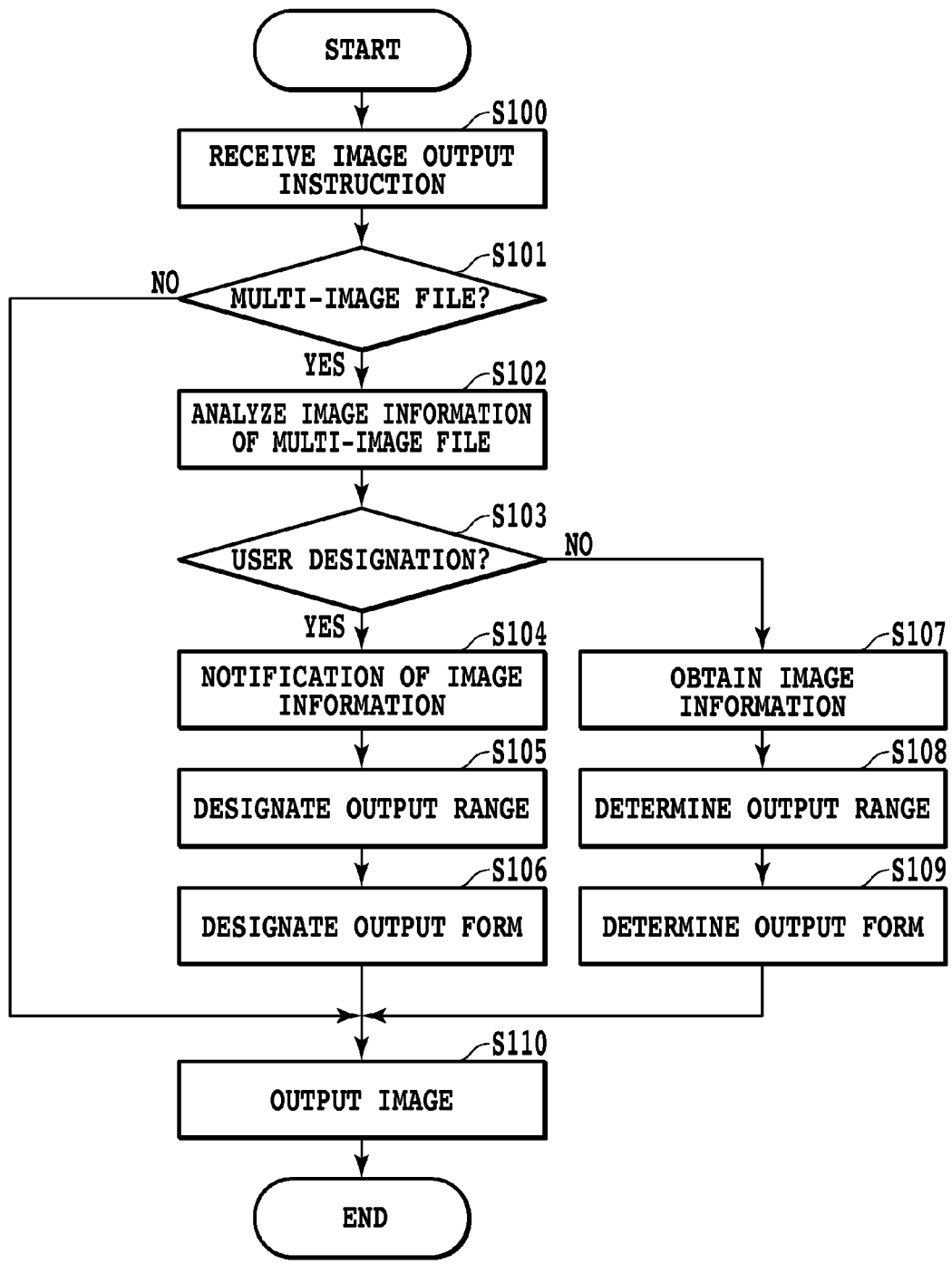
FIG. 1 is a flowchart showing the basic processing performed for first and second embodiments of the present invention.
Figure 2:
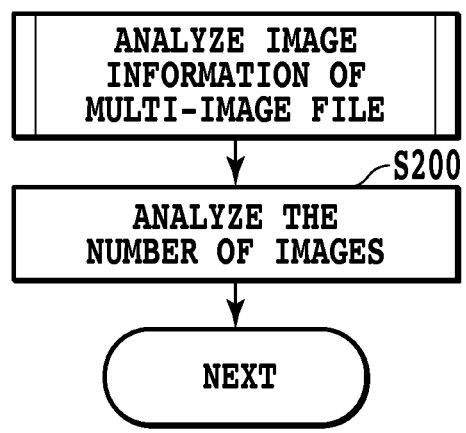
FIG. 2 is a flowchart showing an example process performed at step S102 in FIG. 1.

The preferred embodiments of the present invention will now be described by employing the accompanying drawings.

First Embodiment

In a first embodiment of the present invention, a user receives image information consisting of the number of images stored in a multi-image file, relevant image numbers and the dates and time at which the images were created, and also designates an output range. Further, in this embodiment, when a multi-image file includes bracket shot images, a user designates an output form.

An image processing apparatus (multifunction peripheral) according to this embodiment will now be described while referring to FIG. 14.

Image data read by an manuscript reader 600 is transmitted to a data processor/controller 602, via an input unit I/F 610.

Then, when the image data is received by the data processor/controller 602, a CPU 608 starts a data processing program stored in a program ROM 606, and processes the image data in a RAM 609, using processing data that is stored in a data ROM 607.

The image data that is being or has been processed in the RAM 609, is transmitted, as needed, via a storage unit I/F 614 and stored in an internal storage unit 603. After the data processing has been completed, the resultant image data are transmitted to a data transmitting/receiving unit 604 or an image output unit 605 via an output unit I/F 612.

The image data received by the data transmitting/receiving unit 604 are transmitted to another externally connected data processor, such as a host computer 616 that is accessible via a network.

The image data received by the image output unit 605 are output by being printed, on a recording medium such as paper, by the printing engine included in the copier.

The data transmitting/receiving unit 604 may receive print data from an external host computer 616 (at such time, the copier acts as a printer).

Furthermore, an external storage unit 617, such as a USB memory, may also be loaded into the storage unit I/F 614 and directly input data to the storage unit I/F 614.

To set up the operating environment for the sequential printing of the print data and the image data processing, a user employs an environment setting unit (panel) 601. In accordance with the contents set by the user, the operation of the data processor/controller 602 is set up via the setting unit I/F 611.

A timer 615 is also included in the data processor/controller 602.

A multi-image file format will now be described while referring to FIG. 15.

A file name 706 is stored in a file header 701, and when a storage area is searched to find a stored multi-image file, the file name 706 stored in the file header 701 is displayed. Also stored in the file header 701 is a multi-page holding flag 707, used to indicate whether a single image or multiple images are stored in a multi-image file, the number of images 708, representing the number of images included in a multi-image file, and entry data 709 and 710, of the images included in a multi-image file.

Image headers 702 and 704 are attached to the individual images included in the multi-image file, and each includes an image number 711, uniquely allocated for each image, and an image creation date and time 712. The image number 711 and the image creation date and time 712 are written by an apparatus that creates the individual images.

Each image header also includes an image creation condition 713, in which information is stored that indicates a condition under which an image included in a multi-image file was created, and an image creation attribute 714, which is accompanied by an image based on a creation condition.

For example, for a case in which multiple shots of the same landscape are taken by a digital camera using different exposure settings, "exposure bracket shooting" is stored as the image creation condition 713. And, for example, for a case in which multiple shots of the same landscape are taken by a digital camera using different exposure settings, "exposure amount: center value, −N value and +N value" are stored as the image creation attribute 714.

And, for example, when multiple consecutive images are produced with a digital camera that is being used for consecutive panoramic shootings, "panoramic shooting" is stored in the image creation condition 713. And, for example, when multiple consecutive images are produced with a digital camera that is being used for consecutive panoramic shootings, "values of shooting positions" are stored in the image creation attribute 714.

The results obtained by grouping the images included in a multi-image file are stored as group information 715. And when the images that are stored in a multi-image file are divided into sets consisting of main and sub images, a flag indicating whether the pertinent images stored is the main image is stored in the main image flag 716.

The main body of the individual image data is stored in the image areas 703 and 705 using a conventional data format, such as JPEG.

The first embodiment of the present invention will now be described in detail.

The basic processing will be described by employing the flowcharts in FIGS. 1, 2 to 4 and 16 to 20.

When a user selects the output button on the environment setting unit 601, at step S100 in FIG. 1, the data processor/controller 602 initiates the following processing. That is, the data processor/controller 602 extracts, from the internal storage unit 603 or from the external storage unit 617 via the data transmitting/receiving unit 604, the image file that the user has selected using the output button, and stores the image file in the image file in the RAM 609.

At step S101, a multi-image file format determination program, which is stored in the program ROM 606 and is called by the CPU 608, examines the file header 701 of the image file and determines whether the image file is a multi-image file created using a multi-image file format.

When it is determined that the image file is an image file having a normal format, at step S110, for an ordinary single image output, processing is performed for the pertinent image file, and the processing is thereafter terminated.

When it is determined at step S101 that the image file is a multi-image file having a multi-image file format, the processing advances to step S102.

At step S102, image information of the multi-image file is stored in the program ROM 606 and is analyzed by an analysis program called by the CPU 608.

The analyzing processing that is to be performed at step S102 is performed as follows. First, at step S200 in FIG. 2, a value is analyzed that is stored, as the number of images 708, in the file header 701. Then, a value is analyzed that is stored, as the image number 711, in the image header. And step S103 in FIG. 1 is performed thereafter.

At step S103, a process is performed for switching between a manual selection, made by a user, (user selection) and an automatic selection, provided by an apparatus, for a multi-image image that is to be output target. For this, a program for performing the process at step S103 is called from the ROM 606 by the CPU 608, and is performed.

For this embodiment, it is assumed that at step S103 the selection is changed to a user selection, and that program control then advances to step S104.

At step S104, a notification process is performed for image information obtained by the analysis performed at step S102.

Figure 3:
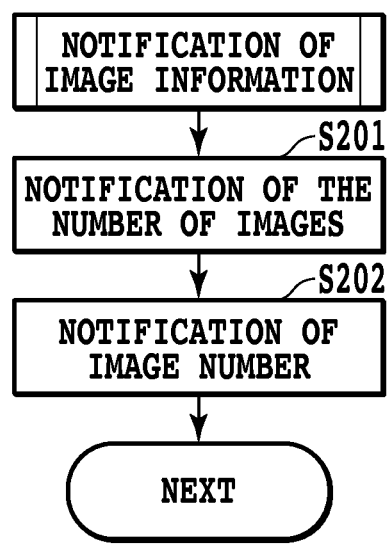
FIG. 3 is a flowchart showing an example process performed at step S104 in FIG. 1.

Specifically, at step S201 in FIG. 3, a notice of the number of images included in the image information analyzed at step S102 is given.

At step S202, a notice of image numbers included in the image information analyzed at step S102 are given. And the number of images and image numbers are then displayed on the environmental setting unit 601, via the setting unit I/F 611 in FIG. 14.

Figure 16:
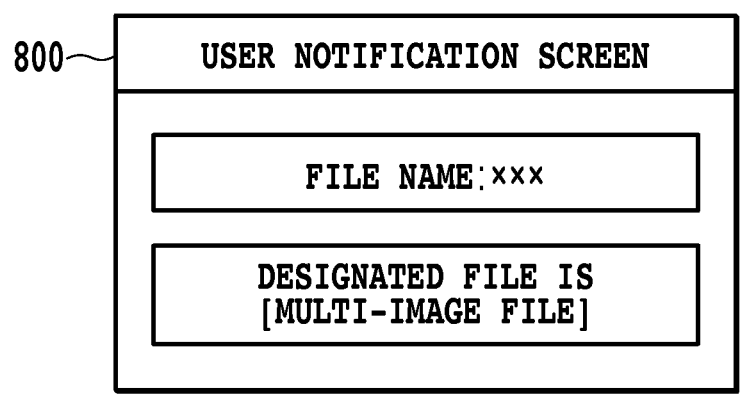
FIG. 16 is a diagram illustrating an example display screen according to the embodiment.

The method employed for displaying the number of images and image numbers will be described while referring to FIGS. 16 and 17. And when a user has selected an image, the user will identify the image and verify, on a display screen 800 in FIG. 16, that the selected image is a multi-image file.

Figure 17:
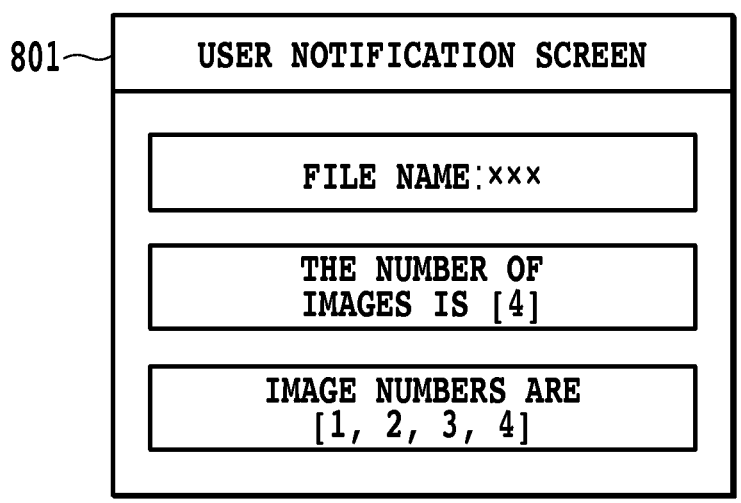
FIG. 17 is a diagram illustrating another example display screen according to the embodiment.

Following this, the number of images and image numbers, included in the image information analyzed at step S102, are presented as image information on a display screen 801 in FIG. 17.

Consequently, step S105 in FIG. 1 is performed, and the designation of the output range at step S105 and the designation of the output form at step S106 is performed as follows, based on an instruction received from a user at the environment setting unit 601.

Figure 4:
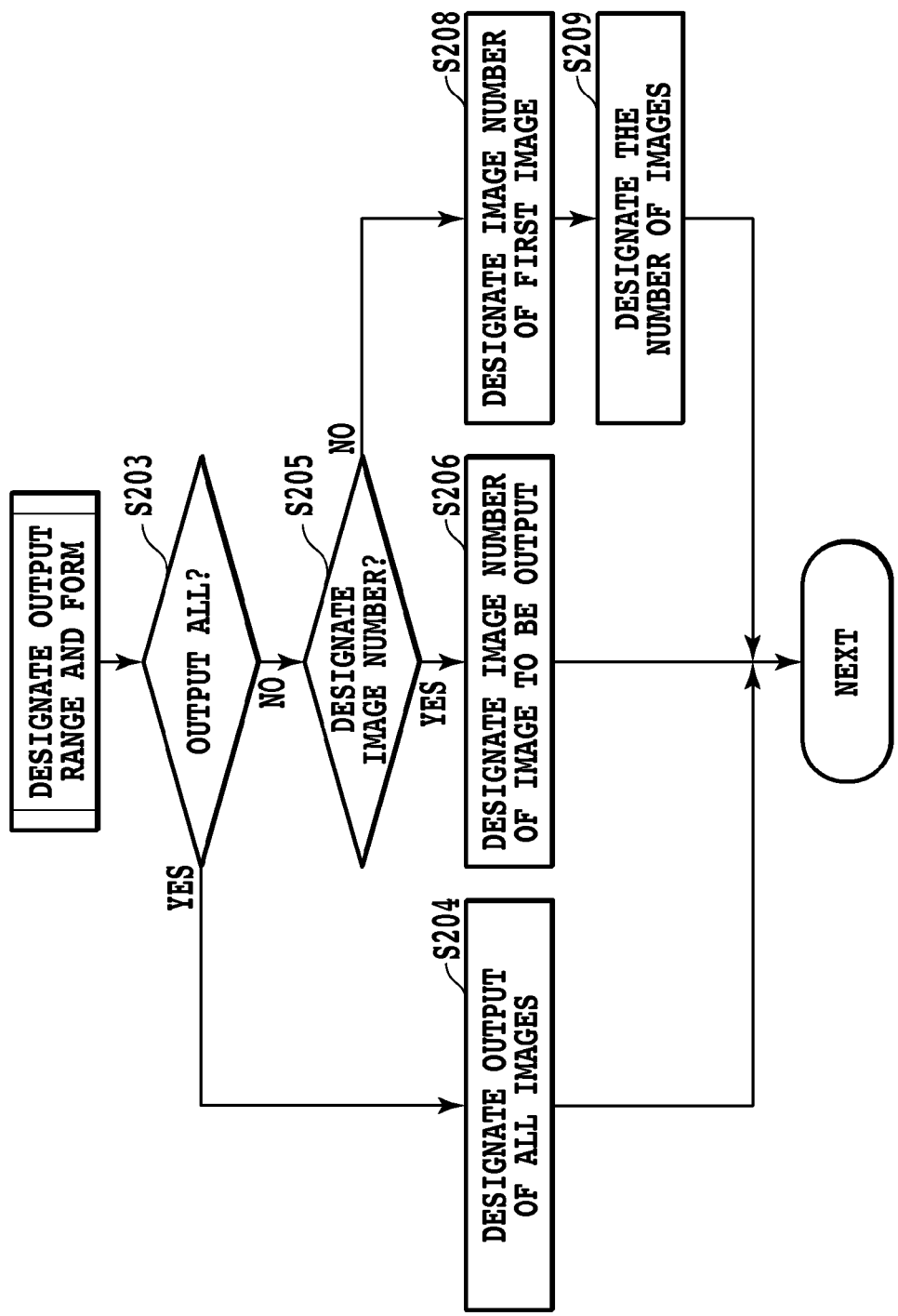
FIG. 4 is a flowchart showing an example process performed at steps S105 and S106 in FIG. 1.

First, at step S203 in FIG. 4, the environment setting unit 601 determines whether the user's instruction indicated that all, or only some, of the images included in the multi-image file are to be output.

When it is determined at step S203 that the user's instruction indicated that all of the images are to be output, at step S204 the environment setting unit 601 accepts the user's instruction to output all the images, and the processing then advances to step S106 in FIG. 1.

When it is determined at step S203 that the user's instruction indicated that some of the other images are to be output, the processing moves to step S205.

At step S205, the environment setting unit 601 determines whether the user's instruction employs image numbers, or employs the image number of a first image and the number of images to designate the images to be output.

When it is determined at step S205 that the user's instruction employs image numbers to designate images to be output target, the processing advances to step S206, and the environment setting unit 601 accepts from the user the image numbers designated for output target.

When it is determined at step S205 that, to designate images to be output, the user's instruction employs the image number only of the first image and the number of images, the processing is shifted to step S208.

At step S208, the environment setting unit 601 accepts from the user the image number of the first image, which is included among the images to be output.

At step S209, the environment setting unit 601 accepts from the user the number of images of the images designated for output target.

Figure 18:
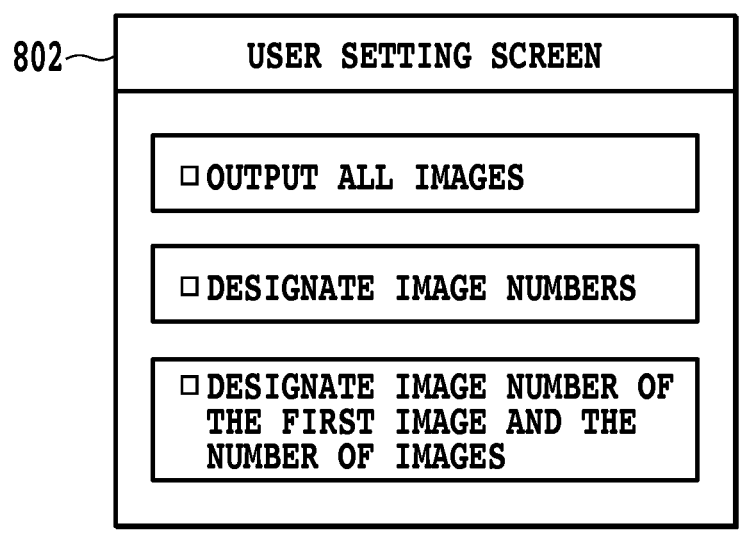
FIG. 18 is a diagram illustrating an additional example display screen according to the embodiment.

Further, at step S203, the environment setting unit 601 may also present to the user a UI display shown in FIG. 18.

Figure 19:
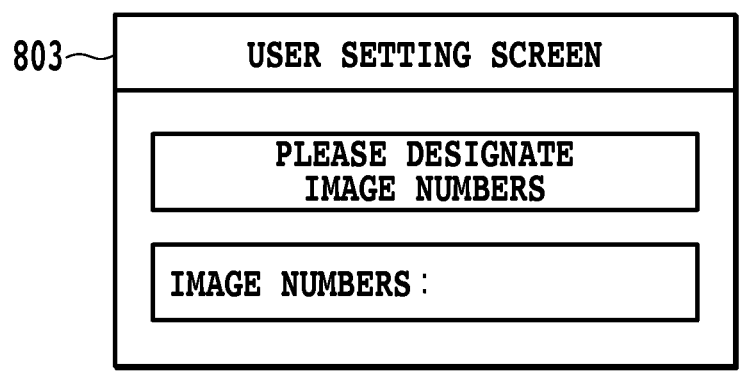
FIG. 19 is a diagram illustrating one more example display screen according to the embodiment.

Furthermore, at step S206, the environment setting unit 601 may also present to the user a UI display shown in FIG. 19.

Figure 20:
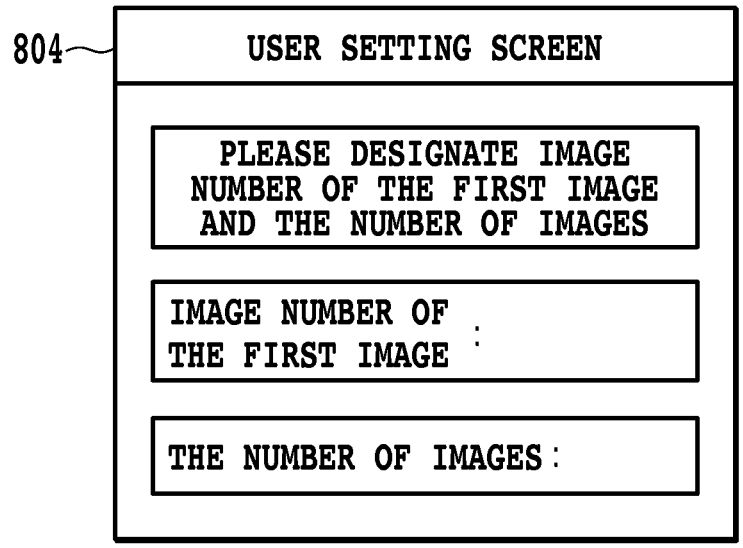
FIG. 20 is a diagram illustrating one further example display screen according to the embodiment.
Figure 21:
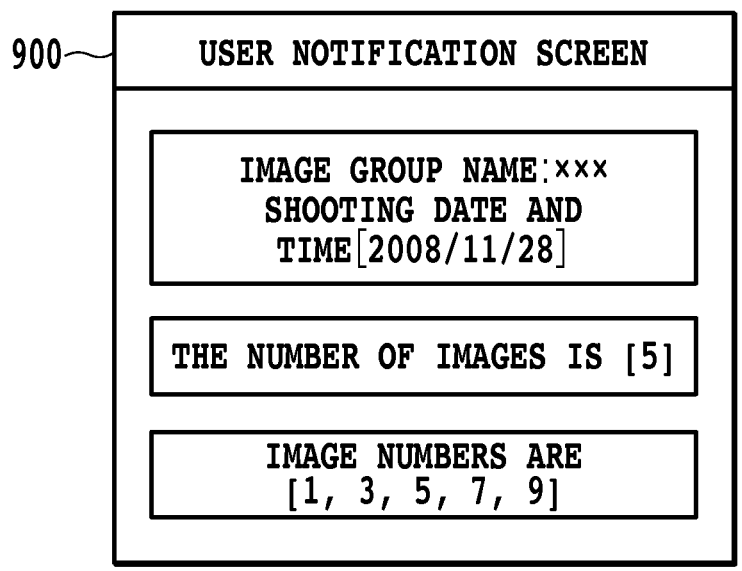
FIG. 21 is a diagram illustrating yet another example display screen according to the embodiment.
Figure 22:
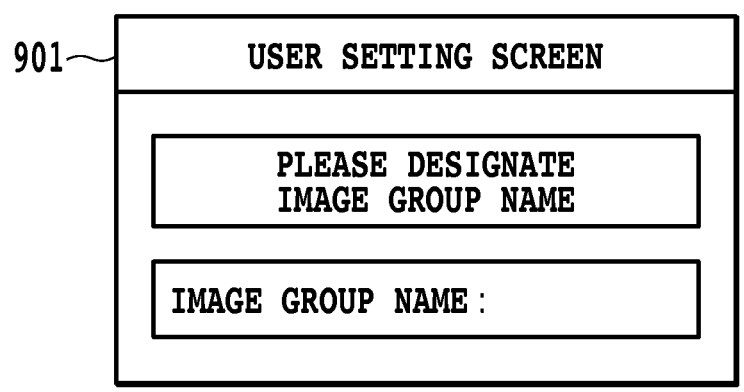
FIG. 22 is a diagram illustrating yet another example display screen according to the embodiment.

Additionally, at step S208 or S209, the environment setting unit 601 may present to the user a UI display shown in FIG. 20.

When the above described processing has been performed, program control advances to step S106 in FIG. 1. A process at step S106 for designating the output form will be described later.

The processes at steps S107 to S109, in which images included in a multi-image file are automatically designated, rather than manually, by a user, will be described while referring to a second embodiment of the present invention.

When all the processes have been performed, at step S110, the images designated to be output target are transmitted to the image output unit 605, via the output unit I/F 612 in FIG.

14, where they are output. The outputting of these images includes the storing of the images in the external storage unit 617, the transmission of the images, via the data transmitting/receiving unit 604, to a network or an externally connected host computer, and the transmission of the images via facsimile.

The basic processing for this embodiment, shown in FIG. 1, has been described. Hereinafter, a portion of the processing performed for this embodiment that differs from the above described basic processing in FIG. 1 will now be described.

For this embodiment, an example process will be described by employing the flowcharts in FIGS. 1, 5 to 7, and 21 and 22.

Figure 5:
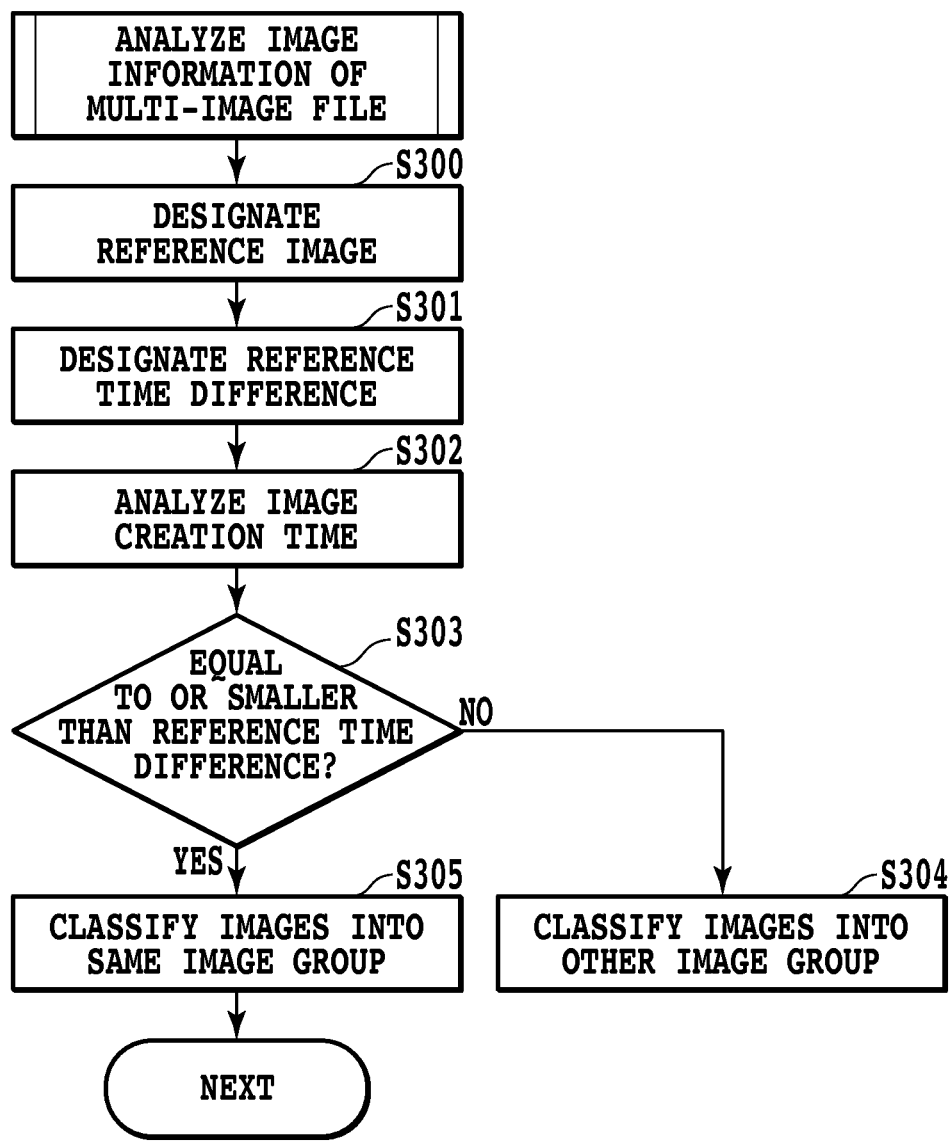
FIG. 5 is a flowchart showing another example process performed at step S102 in FIG. 1.

In the image information analyzing process at step S102 in FIG. 1, the processing from steps S300 to S305 in FIG. 5 is performed by the analysis program that is stored in the program ROM 606 by the data processor/controller 602 and is executed by the CPU 608. The processing, beginning with steps S300 to 305 in FIG. 5, will now be described.

First, at step S300, an image to be employed as a reference image is designated from a multi-image file.

Then, at step S301, a time difference to be employed as a reference (a time difference reference) is designated.

Next, at step S302, the image creation time is analyzed. Specifically, at step S302, for each image included in the multi-image file, a time difference is calculated between the image creation date and time of the image and the image creation date and time of the reference image.

Following this, at step S303, the difference between the image creation date and time of each image included in the multi-image file and the image creation date and time of the reference image is compared with the reference time difference designated at step S301.

Then, at step S303, a check is performed to determine whether the difference between the image creation date and time of each image included in the multi-image file and the image creation date and time of the reference image is equal to or smaller than the reference time difference.

When it is determined at step S303 that the difference between the image creation date and time of each image included in the multi-image file and the image creation date and time of the reference image is greater than the reference time difference, program control advances to step S304.

However, when it is determined at step S303 that the difference between the image creation date and time of each image included in the multi-image file and the image creation date and time of the reference image is equal to or smaller than the reference time difference, program control moves to step S305.

At step S304, the individual images included in the multi-image file are classified into other image groups.

While at step S305, the individual images included in the multi-image file are regarded as a single group.

Figure 6:
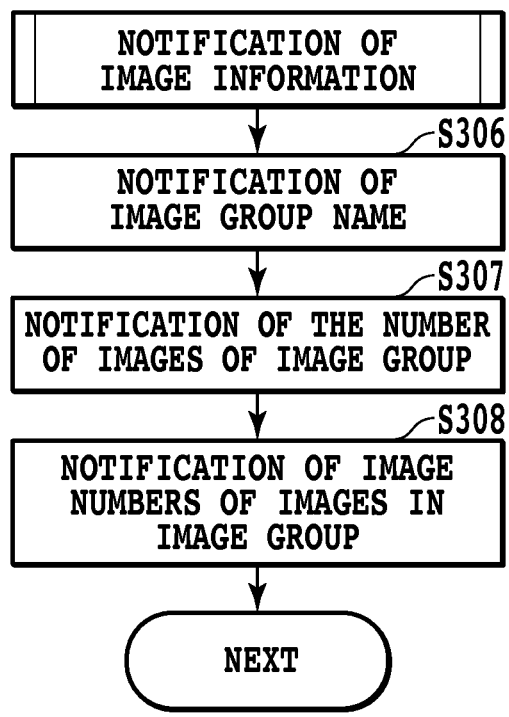
FIG. 6 is a flowchart showing another example process performed at step S104 in FIG. 1.

In the image information notification process at step S104 in FIG. 1, the processing from steps S306 to S308 of FIG. 6 is performed as follows.

First, at step S306 a notice of the names of image groups classified by the process in FIG. 5 is given.

Then, continuing sequentially, at step S307 a notice of the number of images of each image group classified by the process in FIG. 5 is given.

And at step S308 a notice of the image numbers of the images included in the individual image groups classified by the process in FIG. 5 is given.

Figure 14:
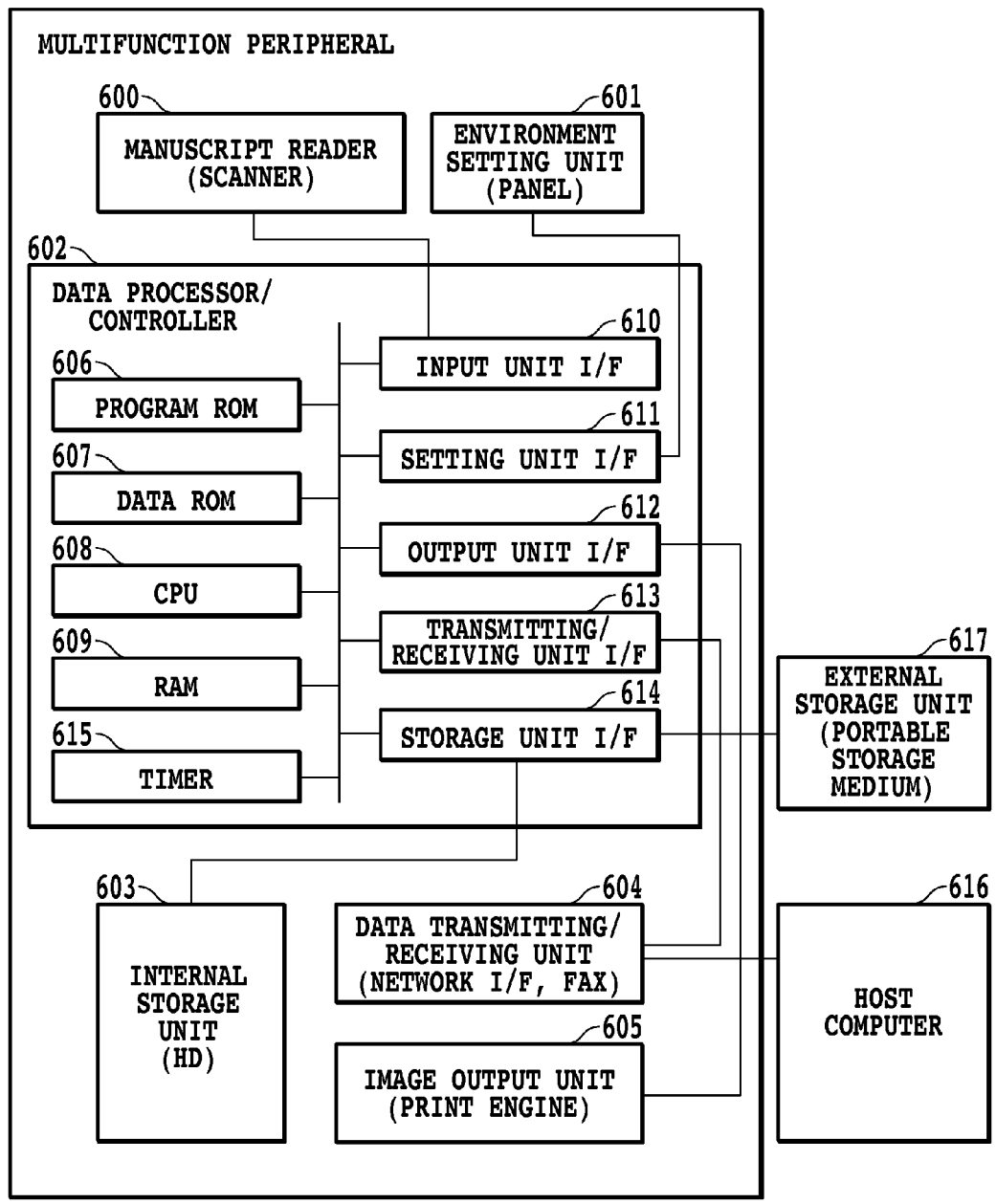
FIG. 14 is a diagram illustrating an image processing apparatus according to the embodiment of the present invention.

Then, while employing the process in FIG. 6, the environment setting unit 601 in FIG. 14 displays an image group name, the number of images and the image numbers of the images in the image group. At this time, the environment setting unit 601 provides a display screen 900 shown in FIG. 21.

Figure 7:
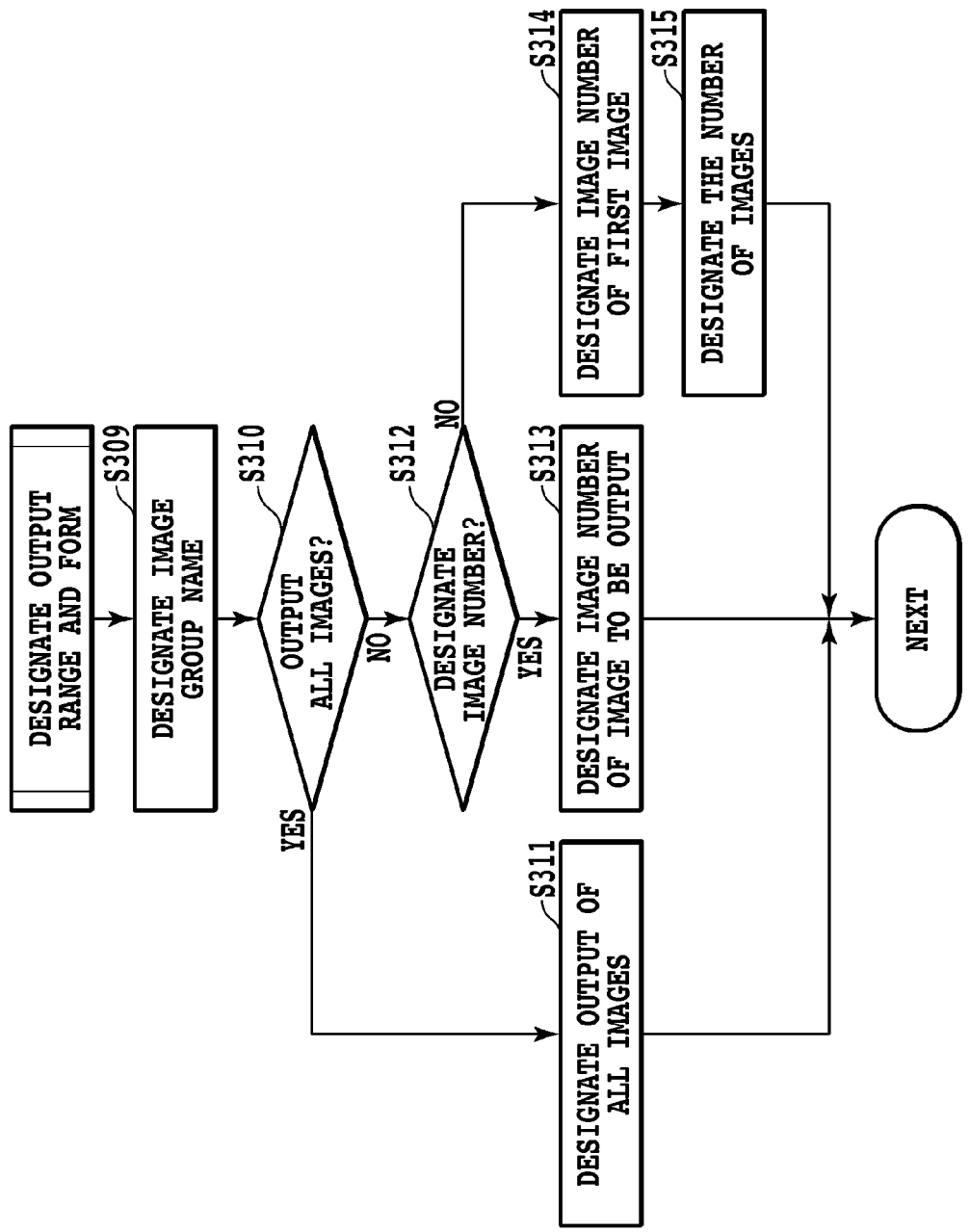
FIG. 7 is a flowchart showing another example process performed at steps S105 and S106 in FIG. 1.

At steps S105 and S106 in FIG. 1, the processing at steps S309 to S315 in FIG. 7 is performed.

First, at step S309, the environment setting unit 601 accepts from a user a designated name of an image group to be output. At this time, the environment setting unit 601 displays a display screen 901 shown in FIG. 22.

Since steps S310, S311, S312, S313, S314 and S315 respectively correspond to steps S203, S204, S205, S206, S208 and S209, the processing at steps S310 to S315 is performed as previously described.

Another example of the processing performed in this embodiment will now be described while referring to FIGS. 1, 8 to 10 and 23 to 28.

For the image information analyzing performed at step S102 in FIG. 1, the analysis program stored in the program ROM 606 of the data processor/controller 602 in FIG. 14 and executed by the CPU 608 performs the processing at steps S400 to S403 in FIG. 8 as follows.

Figure 15:
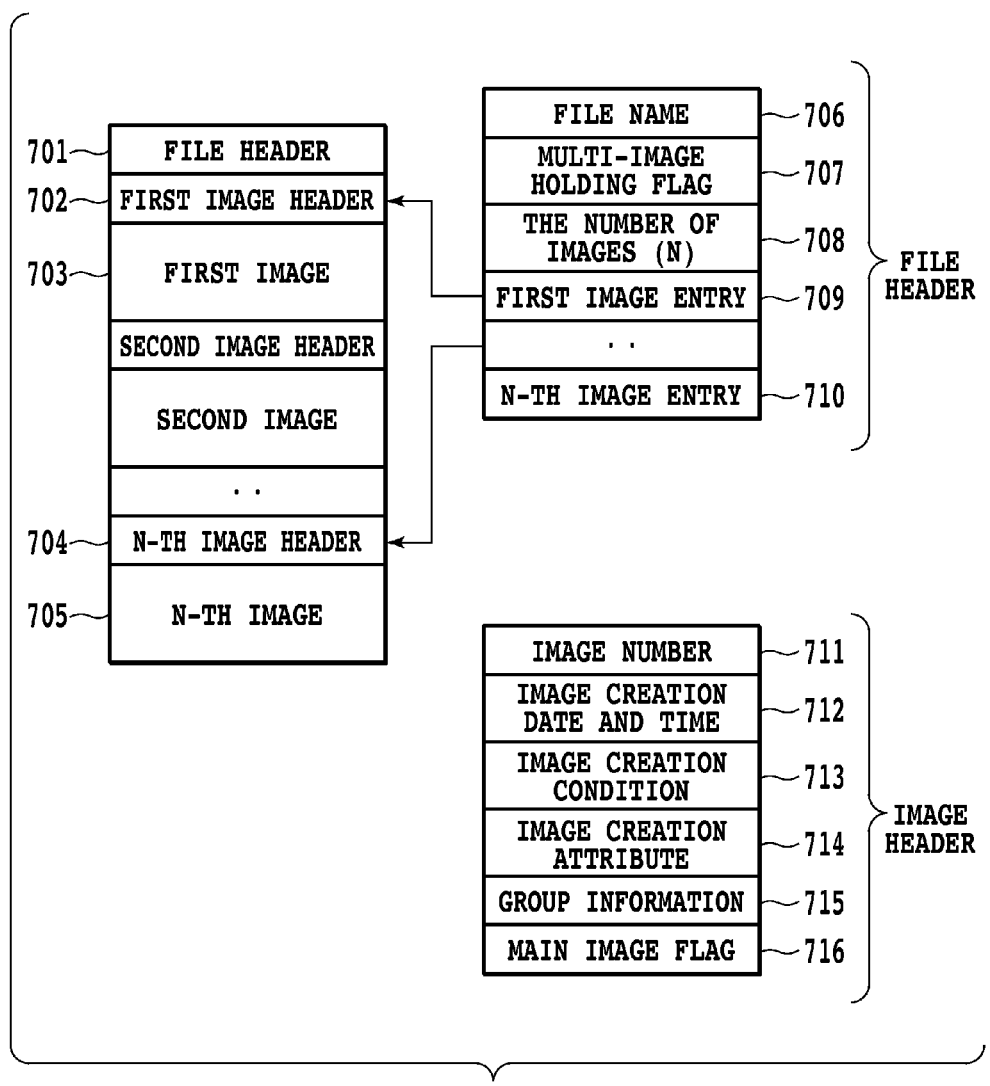
FIG. 15 is a diagram illustrating a multi-image file format according to the embodiment.

First, at step S400, the image creation condition 713 of the image header in FIG. 15 is employed to determine whether images included in a multi-image file are "bracket shot images".

Figure 8:
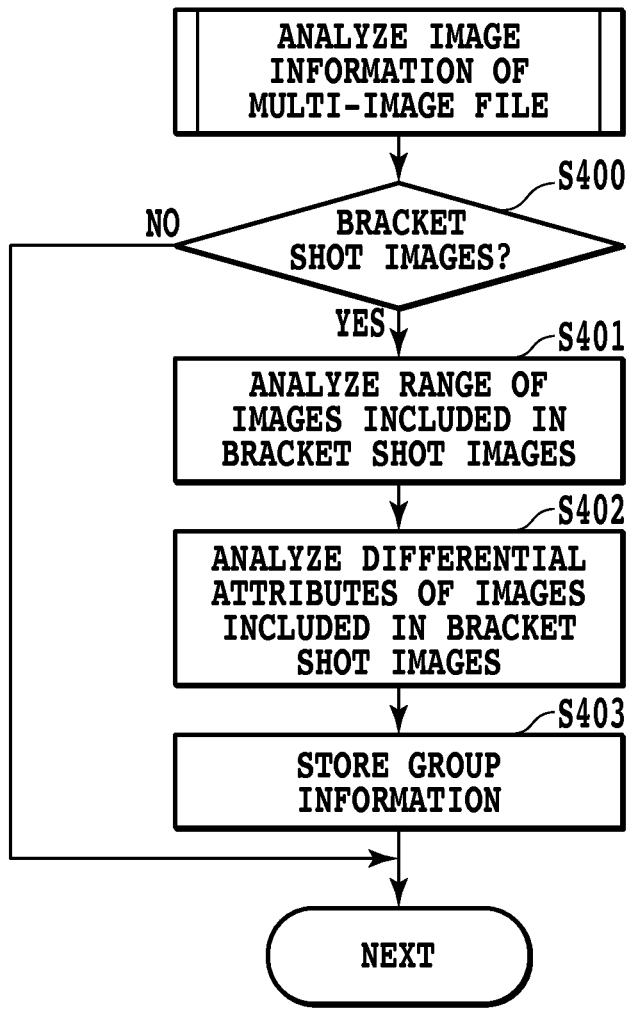
FIG. 8 is a flowchart showing an additional example process performed at step S102 in FIG. 1.

When it is determined at step S400 that images included in the multi-image file are not "bracket shot images", the processing shown in FIG. 8 is terminated.

When it is determined at step S400 that the images are "bracket shot images", at step S401 the image range of the bracket shot images is analyzed.

At step S402, "difference between shooting conditions to perform bracket shooting" (a differential attribute) is obtained based on an image creation attribute 714 provided with the group of bracket shot images, and is analyzed for each of the bracket shot images.

At step S403, the image creation attribute 714 of the group of bracket shot images is stored as group information 715.

Figure 9:
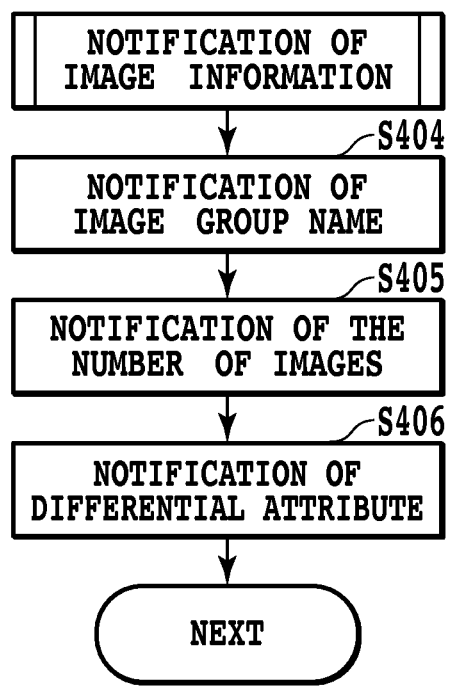
FIG. 9 is a flowchart showing an additional example process performed at step S104 in FIG. 1.

For the image information notification process at step S104 in FIG. 1, the processing at steps S404 to S406 in FIG. 9 is performed as follows.

First, at step S404, a notice of the image group names of the group of bracket shot images is given.

At step S405, a notice of the number of images of the bracket shot image group is given.

At step S406, a notice of the differential attribute of the bracket shot images is given.

Figure 23:
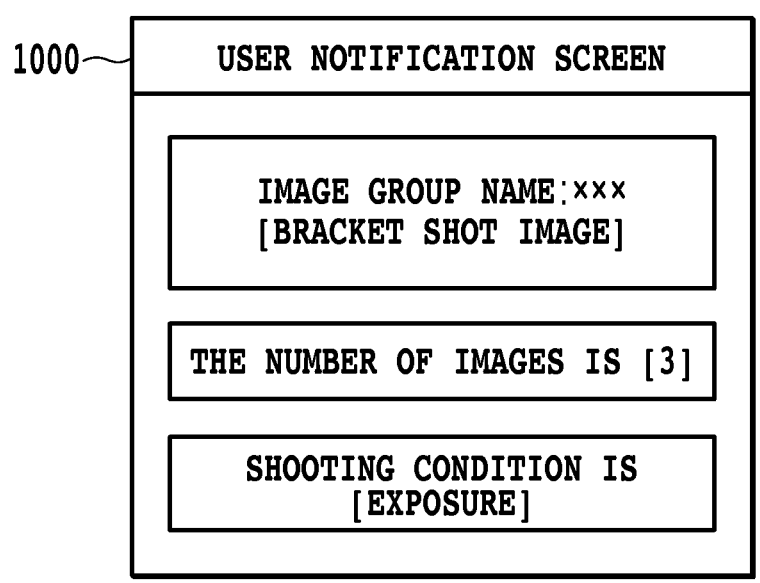
FIG. 23 is a diagram illustrating yet one more example display screen according to the embodiment.

During the processing performed in FIG. 9, for example, the environment setting unit 601 in FIG. 14 employs a display screen 1000, shown in FIG. 23, to display an image group name, the number of images and a shooting condition. The display screen 1000 shown in FIG. 23 is provided for exposure bracket shooting, and for image segments taken to create a panorama, a display screen 1100, shown in FIG. 27, may be displayed.

Figure 10:
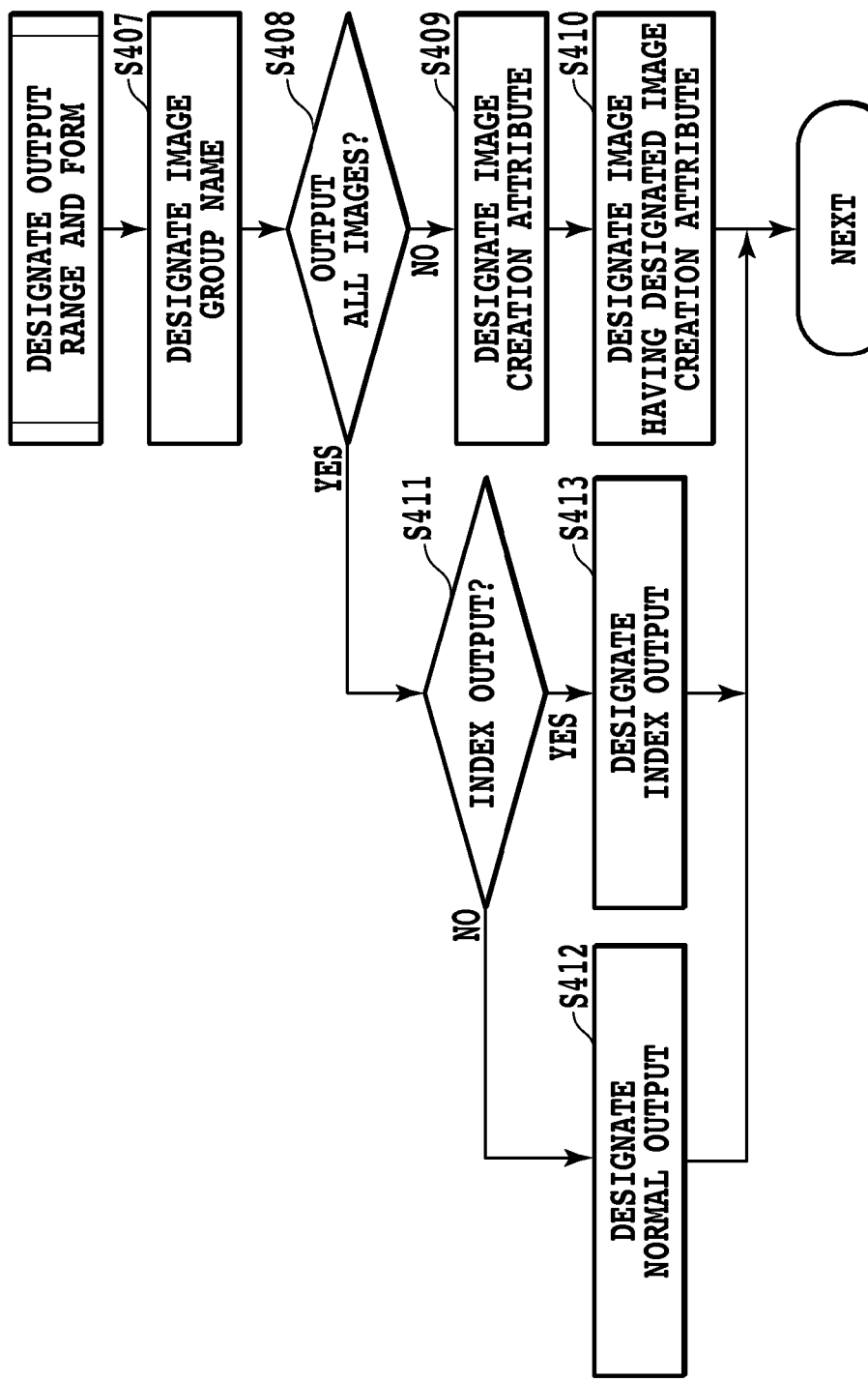
FIG. 10 is a flowchart showing an additional example process performed at steps S105 and S106 in FIG. 1.

At steps S105 and S106 in FIG. 1, the processing at steps S407 to S413 in FIG. 10 is performed in the following manner.

First, at step S407, the environment setting unit 601 accepts from the user the designation of an image group to be output.

Figure 24:
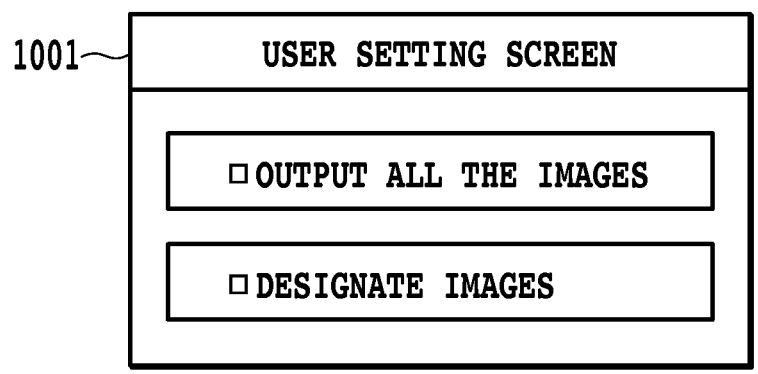
FIG. 24 is a diagram illustrating one further example display screen according to the embodiment.

At step S408, the environment setting unit 601 displays, for example, a display screen 1001, shown in FIG. 24, to determine whether the user has instructed the output of all or some of the images stored in the multi-image file.

When it is determined that at step S408 that the user has instructed the output of all the images, the processing is shifted to step S411.

However, when it is determined that the user has instructed the output of some of the images, the processing advances to step S409.

Figure 26:
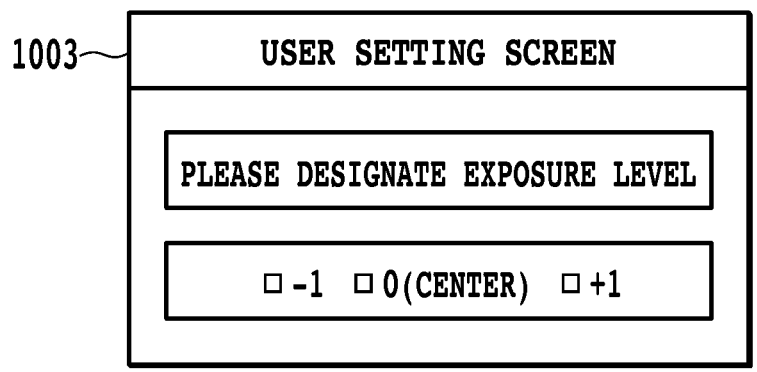
FIG. 26 is a diagram illustrating an additional example display screen according to the embodiment.

At step S409, the environment setting unit 601 displays, for example, a display screen 1003, shown in FIG. 26, and accepts from the user, as a setup condition, the designation of the image creation attribute.

At step S410, the environment setting unit 601 designates an image for which the image creation attribute accepted at step S409 is stored as its image creation attribute 714.

Figure 25:
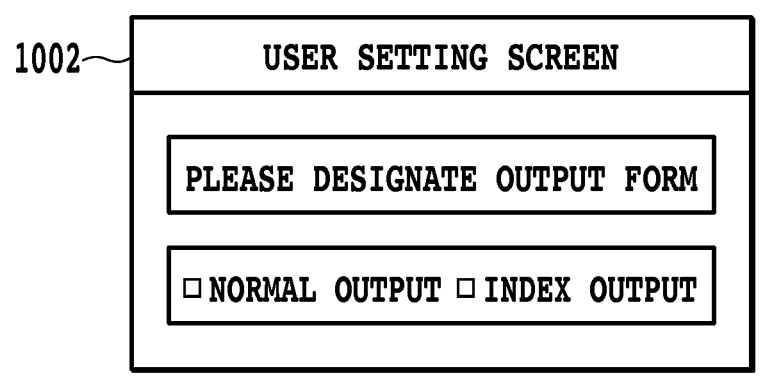
FIG. 25 is a diagram illustrating still another example display screen according to the embodiment.

At step S411, the environment setting unit 601 displays, for example, a display screen 1002, shown in FIG. 25, and accepts from the user the designation of an image output form.

At step S411, the environment setting unit 601 determines whether the user designated the normal output (output of one image for one side) or the index output (output of all the images for one side) for the individual images included in the multi-image file.

Through the above described processing, the output range and the output form can be designated for each image group designated using the image group name.

Figure 27:
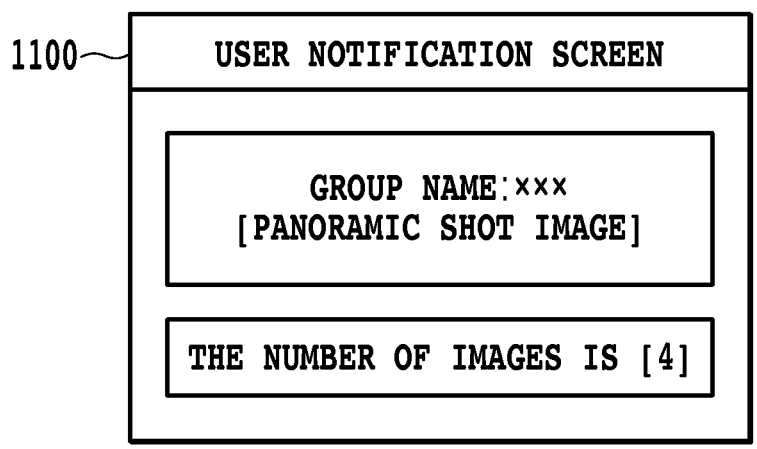
FIG. 27 is a diagram illustrating still one more example display screen according to the embodiment.
Figure 28:
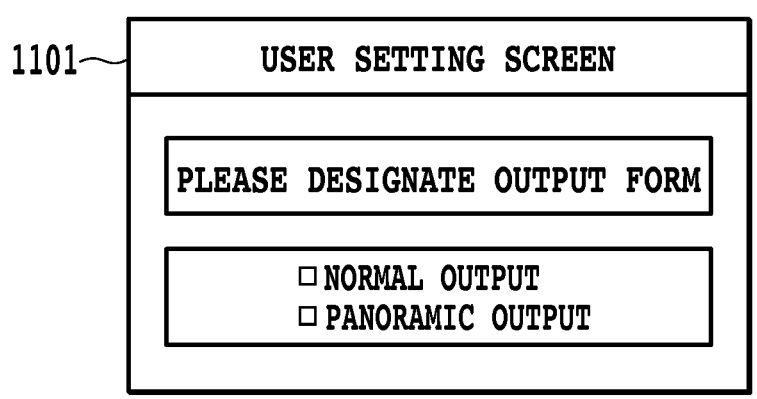
FIG. 28 is a diagram illustrating one further example display screen according to the embodiment.

The display screen 1002, shown in FIG. 25, is provided as a display when required for exposure bracket shot images, and when a display is for panoramic shot images, a display screen 1101, shown in FIG. 27, may be provided. In this case, at step S411, the environment setting unit 601 determines whether the user designated the normal output or the panorama output for the individual images included in a multi-image file.

When it is determined at step S411 that the user has designated the normal output (output of one image for one side) for the individual images in a multi-image file, the processing advances to step S412.

When it is determined at step S411 that the user has designated the index output (output of all the images for one side) for the images in a multi-image file, the processing advances to step S413.

At step S412, the environment setting unit 601 designates the normal output as an image output method.

At step S413, the environment setting unit 601 designates the index output as an image output method.

Second Embodiment

According to a second embodiment of the present invention, image information of images included in a multi-image file are analyzed, and based on the image information, the output range and output form for the images are determined. The image information which is used for the determination is that the image is grouped by specific conditions. (In this embodiment, for example, the image information is "panoramic shot images".)

First, example processing for this embodiment will be described by employing FIGS. 1 and 11 to 13.

Figure 11:
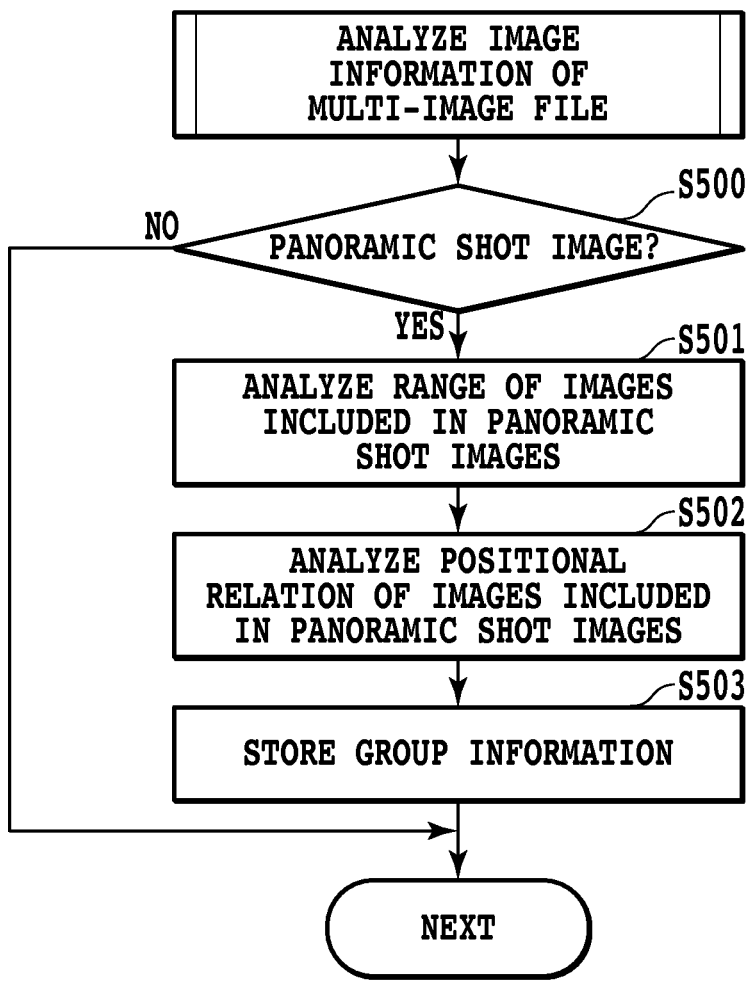
FIG. 11 is a flowchart showing one more example process performed at step S102 in FIG. 1.

For the analyzing of image information at step S102 in FIG. 1, an analysis program that is stored in the program ROM of the data processor/controller 602 of FIG. 14 and is executed by the CPU 608, performs the processing at steps S500 to S503 in FIG. 11 as follows.

First, at step S500, the image creation conditions 713, included in the image headers for the individual images shown in FIG. 15, are examined to determine whether the images included in the multi-image file are "panoramic shot images".

When it is determined at step S500 that the images in the multi-image file are "panoramic shot images", at step S501 an image range for the panoramic shot images is analyzed.

Specifically, at step S501, the image information held in the image creation attributes 714 of the image headers of the individual images are examined to analyze and determine "into which part of the panoramic shot images does each image in the multi-image file fit".

At step S502, the positional relation of an image group is analyzed based on the image creation attributes 714, for the individual panoramic shot images.

At step S503, the image creation attributes 714, for the panoramic shot images, are stored as group information 715.

Figure 12:
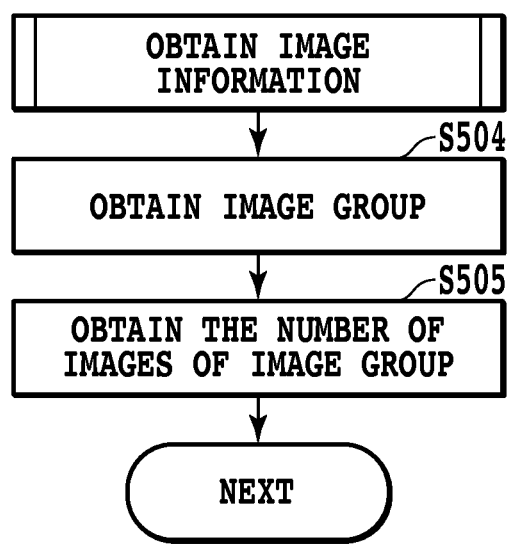
FIG. 12 is a flowchart showing an example process performed at step S107 in FIG. 1.

Following this, for the obtaining of image information at step S107 in FIG. 1, the CPU 608 performs the processing at steps S504 and S505 in FIG. 12.

At step S504, an image group of panoramic shot images is obtained.

At step S505, the number of images of this image group is obtained.

Figure 13:
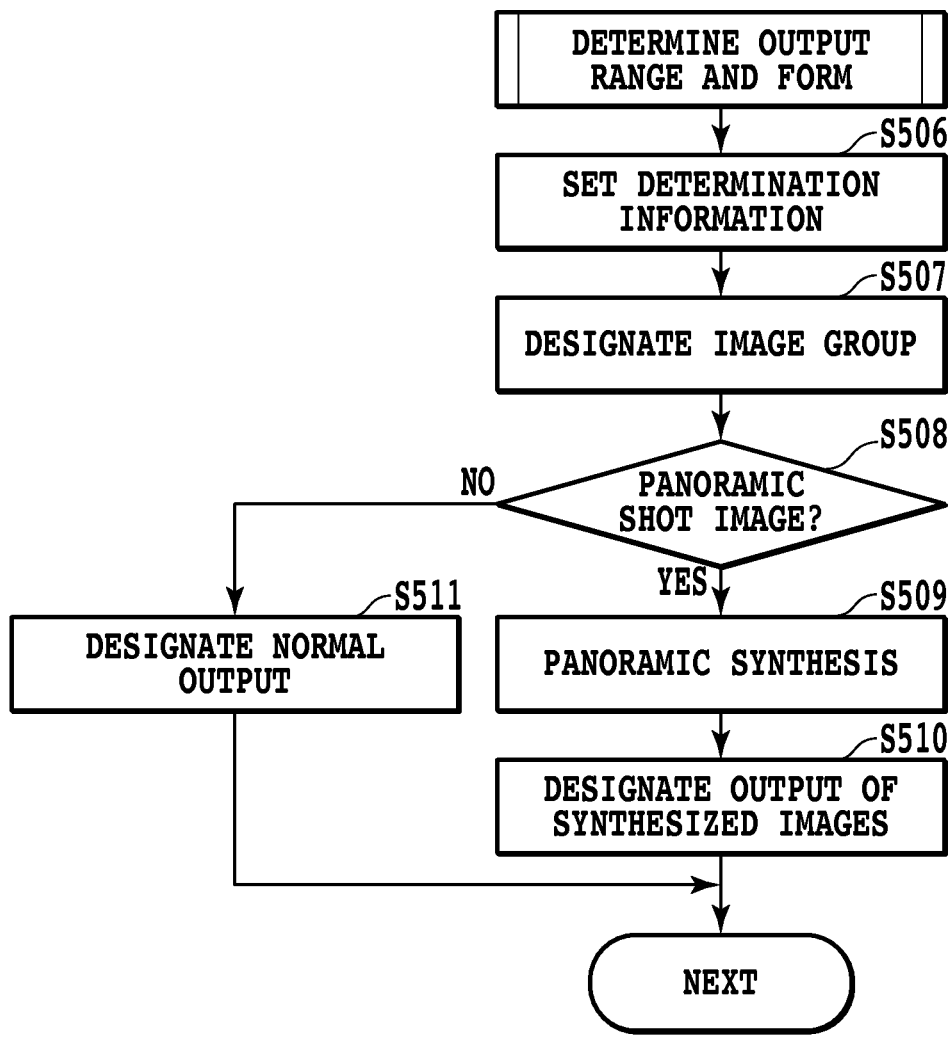
FIG. 13 is a flowchart showing an example process performed at steps S108 and S109 in FIG. 1.

For the determination of an output range and an output form at steps S108 and S109 in FIG. 1, the processing at steps S506 to S511 in FIG. 13 is performed as follows.

First, at step S506, information employed for a determination is set for use. In this case, it is assumed that "when a group of panoramic shot images is an image group to be output, stitch all of the images (prepare an output range) and output the stitched images (an output form)" is set for the operation.

At step S507, an image group to be output is designated for an operation determination.

At step S508, a check is performed to determine whether the image group to be output is a group of panoramic shot images.

When it is determined at step S508 that the image group to be output is a group of panoramic shot images, the processing advances to step S509.

However, if it is determined at step S508 that the image group to be output is not a group of panoramic shot images, the processing is shifted to step S511.

The determination process at step S508 is performed as follows. When the group information 715, for the image headers of the images included in the image group to be output, indicates that this image group is a panoramic shot image group, the processing advances to step S509. But when the group information 715, for the image headers of the images included in the image group to be output, indicates that the image group to be output is not a panoramic shot image group, the processing is shifted to step S511. At step S511, normal output is designated for the images in the image group to be output.

At step S509, the images in the image group are assembled (panorama image stitching) based on the information obtained from the image creation date and time 712, the image creation condition 713 and information obtained from the image creation attribute 714, all of which are provided for the images included in the image group to be output.

Then, at step S510, output of the stitched images in the image group is designated.

Another example of the processing for this embodiment will now be described by employing the flowcharts in FIGS. 1 and 29 to 31.

Figure 29:
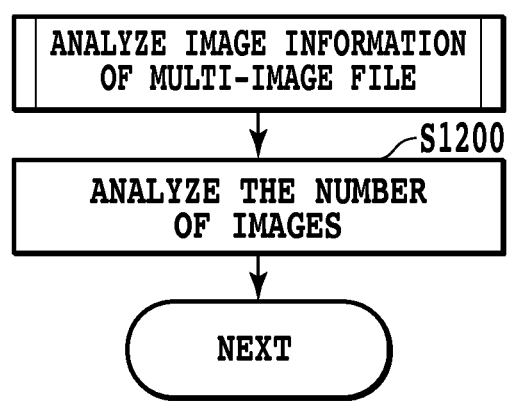
FIG. 29 is a flowchart showing one more example process performed at step S102 in FIG. 1.

First, at step S102 in FIG. 1, the CPU 608 performs the process at step S1200 in FIG. 29. At step S200, a value stored, as the number of images 708, in the file header 701 of a multi-image file is analyzed. Next, a value stored as the image number 711 of the image header is analyzed. Thereafter, the processing returns to step S103 in FIG. 1.

Figure 30:
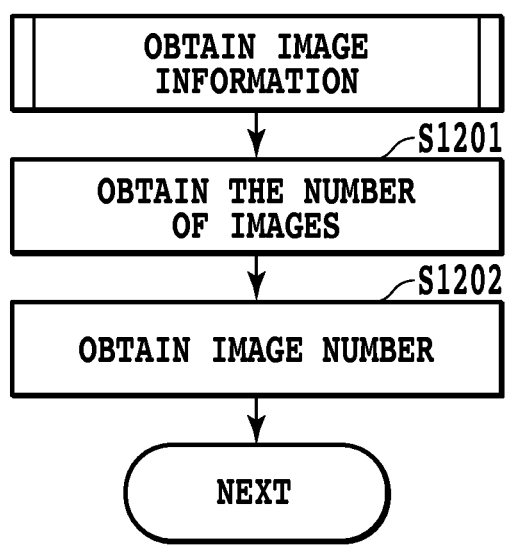
FIG. 30 is a flowchart showing another example process performed at step S107 in FIG. 1.

Further, at step S107 in FIG. 1, the CPU 608 performs the processing at steps S1201 and S1202 in FIG. 30. At step S1201, the number of images analyzed at step S1200 is obtained. Next, at step S1202 the image number analyzed at step S1200 is obtained.

Furthermore, at steps S108 and S109 in FIG. 1, the CPU 608 performs the processing at steps S1203 to S1208 as follows.

At step S1203, a reference number of images is set.

At step S1204, a check is performed to determine whether the number of images obtained at step S1201 is greater than the reference number of images.

When it is determined at step S1205 that the number of images obtained at step S1201 is greater than the reference number of images, the processing advances to step S1205.

When it is determined at step S1205 that the number of images obtained at step S1201 is equal to or smaller than the reference number of images, the processing is shifted to step S1209.

At step S1209, the output of all the images included in a multi-image file is designated.

At step S1205, a check is performed to determine whether only the main image included in a multi-image file is to be output.

When it is determined at step S1205 that only the main image is to be output, the processing advances to step S1206.

When it is determined at step S1205 that images other than the main image are also to be output, the processing is shifted to step S1207.

At step S1206, normal output of the main image is designated.

At step S1207, the image number of the first image included in the multi-image file is designated.

At step S1208, normal output is designated for the images for which for which the number of images corresponds to the reference number of images, beginning with the image number of the first image of the multi-image file that is designated at step S1207.

Through the above described processing, the output range and the output form for the images included in the multi-image file can be determined without the user's instruction being required.

Another example of the processing performed for this embodiment will be described while referring to FIGS. 1 and 32 to 34.

First, at step S102 in FIG. 1, the CPU 608 performs the processing at steps S1300 to S1305, in FIG. 32, as follows.

At step S1300, an image employed as a reference (reference image) is designated from images included in a multi-image file.

At step S1301, a time difference employed as a reference (reference time difference) is designated.

At step S1302, the image creation time is analyzed. Specifically, first, at step S1302, a difference is calculated between the image creation date and time of each image included in a multi-image file and the image creation date and time of the reference image.

At step S1301, the difference between the image creation date and time of each image included in the multi-image file and the creation date and time of the reference image is compared with the reference time difference designated at step S1301.

At step S1303, a check is performed to determine whether the difference between the creation date and time of each image included in the multi-image file and the creation date and time of the reference image is equal to or smaller than the reference time difference.

When it is determined at step S1303 that the difference between the image creation date and time of each image in the multi-image file and the creation date and time of the reference image is greater than the reference time difference, the processing advances to step S1304.

When it is determined at step S1303 that the difference between the image creation date and time of each image in the multi-image file and the creation date and time of reference image is equal to or smaller than the reference time difference, the processing moves to step S1305.

At step S1304, the individual images in the multi-image file are classified into other image groups.

At step S1305, the images of the multi-image file are regarded as the same image group.

Figure 33:
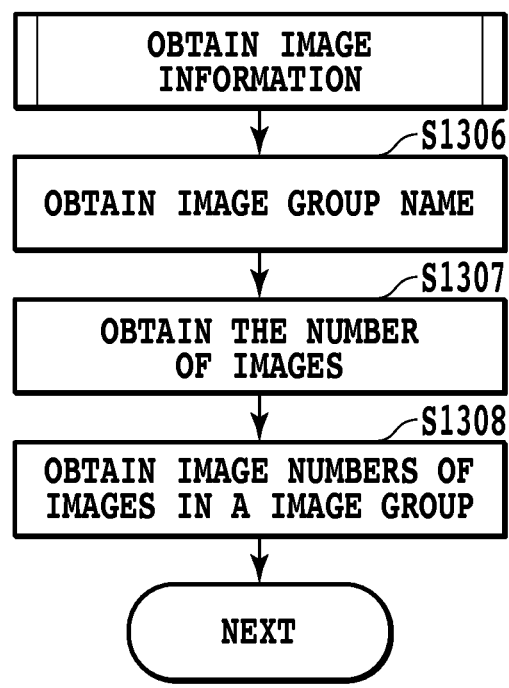
FIG. 33 is a flowchart showing an additional process performed at step S107 in FIG. 1.

Further, at step S107 in FIG. 1, the CPU 608 performs the processing at steps S1306 to S1308 in FIG. 33.

Figure 32:
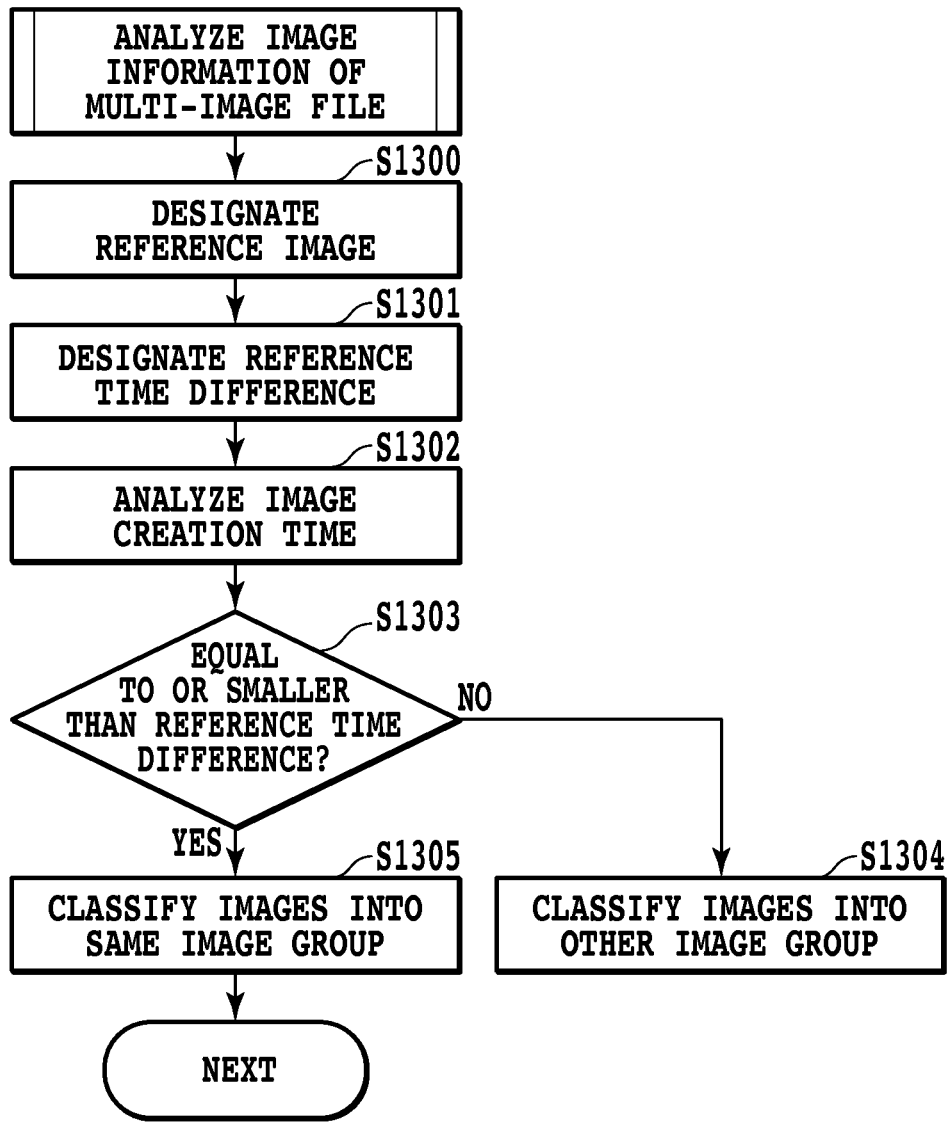
FIG. 32 is a flowchart showing yet another example process performed at step S102 in FIG. 1.

At step S1306, a notice of the names of the image groups obtained in the process in FIG. 32 is given.

At step S1307, a notice of the number of images of the images classified in each image group obtained in the process in FIG. 32 is given.

At step S1308, a notice of the image numbers of the images classified in each image group obtained in the process in FIG. 32 is given.

Furthermore, for the determination of an output range and an output form at steps S108 and S109 in FIG. 1, the processing at steps S1309 to S1316 is performed as follows.

First, at step S1309, an image group name obtained at step S1306 is designated.

At step S1310, a reference number of images is set.

At step S1311, a check is performed to determine whether the number of images obtained at step S1307 is greater than the reference number of images.

When it is determined at step S1311 that the number of images obtained at step S1307 is greater than the reference number of images, the processing advances to step S1312.

When it is determined at step S1311 that the number of images obtained at step s1307 is equal to or smaller than the reference number of images, the processing is moved to step S1316.

At step S1316, the output of all the images in the multi-image file is designated.

At step S1312, a check is performed to determine whether only the main image in the multi-image file is to be output.

When it is determined at step S1312 that only the main image is to be output, the processing advances to step S1313.

When it is determined at step S1312 that images other than the main image are also to be output, the processing is shifted to step S1314.

At step S1313, normal output of the main image is designated.

At step S1314, the image number of the first image in the multi-image file is designated.

At step S1315, normal output is designated for the number of images that matches the reference number of images, beginning with the image number of the first image in the multi-image file that is designated at step S1309.

If determined at step S1311 that the number of images obtained at step S1307 is greater than the reference number of images, then only the main image may be output without determining at step S1312.

Through the above described processing, the output range and output form of the images in the multi-image file can be determined, without a user's instruction being required.

Figure 31:
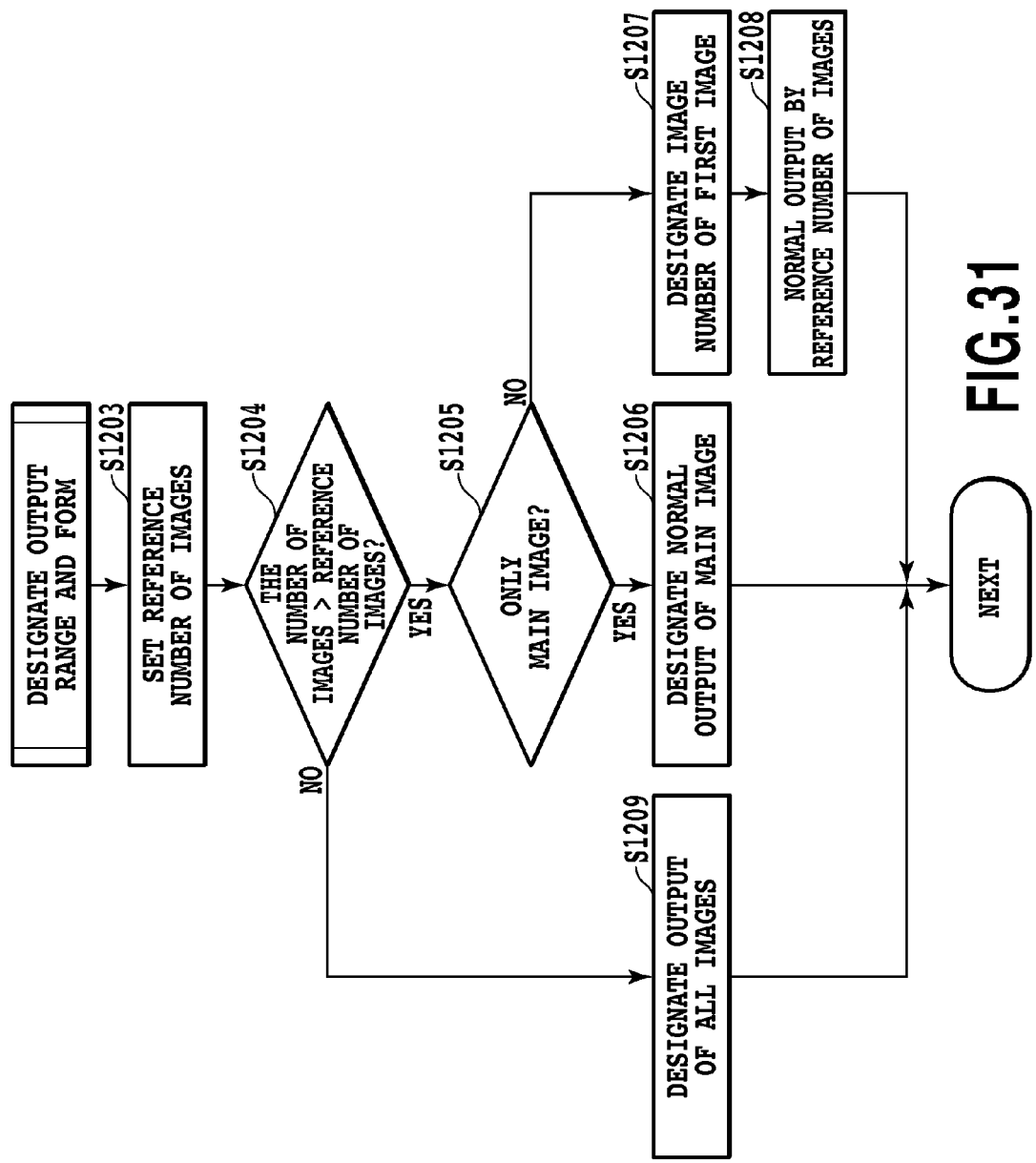
FIG. 31 is a flowchart showing yet another example process performed at steps S108 and S109 in FIG. 1.
Figure 34:
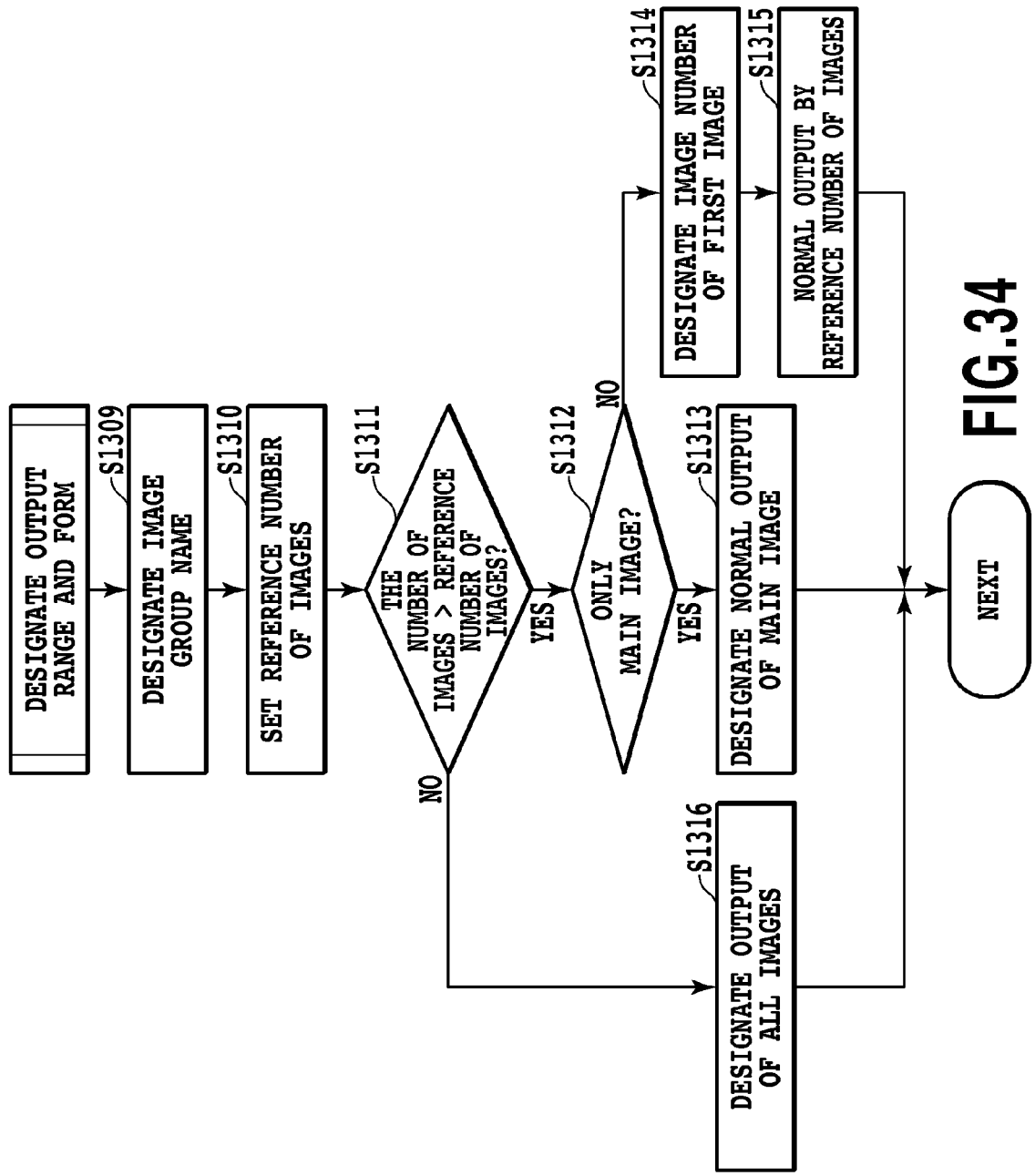
FIG. 34 is a flowchart showing an additional process performed at steps S108 and S109 in FIG. 1.

In this embodiment, at step S1205 in FIG. 31 and at step S1312 in FIG. 34, a check has been performed to determine whether only the main image in the multi-image file should be output. To determine whether a multi-image file includes a main image, the process shown in FIG. 35, for example, is performed.

Figure 35:
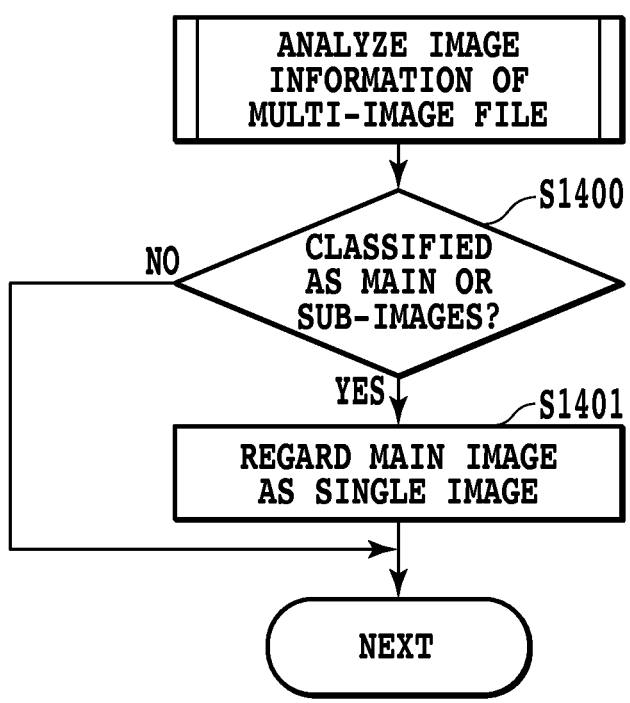
FIG. 35 is a flowchart showing one more example process performed at step S102 in FIG. 1.

As part of the processing at step S102, the CPU 608, for example, performs the process in FIG. 35.

At step S1400, it is determined whether the images in a multi-image file are classified as a main image or sub-images.

When it is determined at step S1400 that no classification have been established and a main image and sub-images have been designated, the processing in FIG. 35 is terminated.

If, however, it is determined at step S14100 that the images are classified as a main image and sub-images, the processing advances to step S1401.

At step S1400, the main image is employed as a single image.

As described above, according to this embodiment, multiple images included in a multi-image file can be selectively processed.

Third Embodiment

According to this embodiment, image information of images included in a multi-image file are analyzed, and for each image, based on the image information, an output range and an output form are determined. The image information used for this determination indicate the number of sub-images and the grouping of images in accordance with the times the shots were taken.

Figure 36:
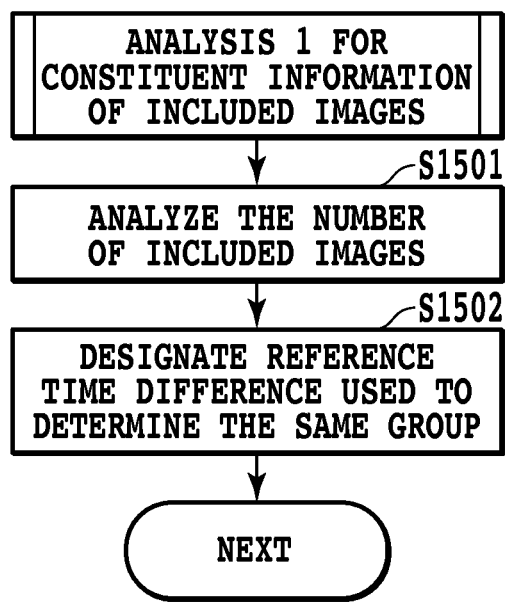
FIG. 36 is a flowchart showing the processing performed for third embodiments of the present invention.

When it is determined at step S101 in FIG. 1 that the designated image file is a multi-image file, the process in FIG. 36, i.e., "Analysis 1 for constituent information of the included images", is performed as the image information analysis process at step S102. Specifically, at step S1501, the number of images included in the multi-image file is analyzed. At step S1502, a reference time difference is designated in order to divide the images into groups in accordance with the times the shots were taken. A specific time may either be stored in advance, as a reference time difference, in the data ROM 607 or the internal storage unit 603 in FIG. 14, or may be designated by a user through the process previously described at step S301 in the first embodiment.

Figure 37:
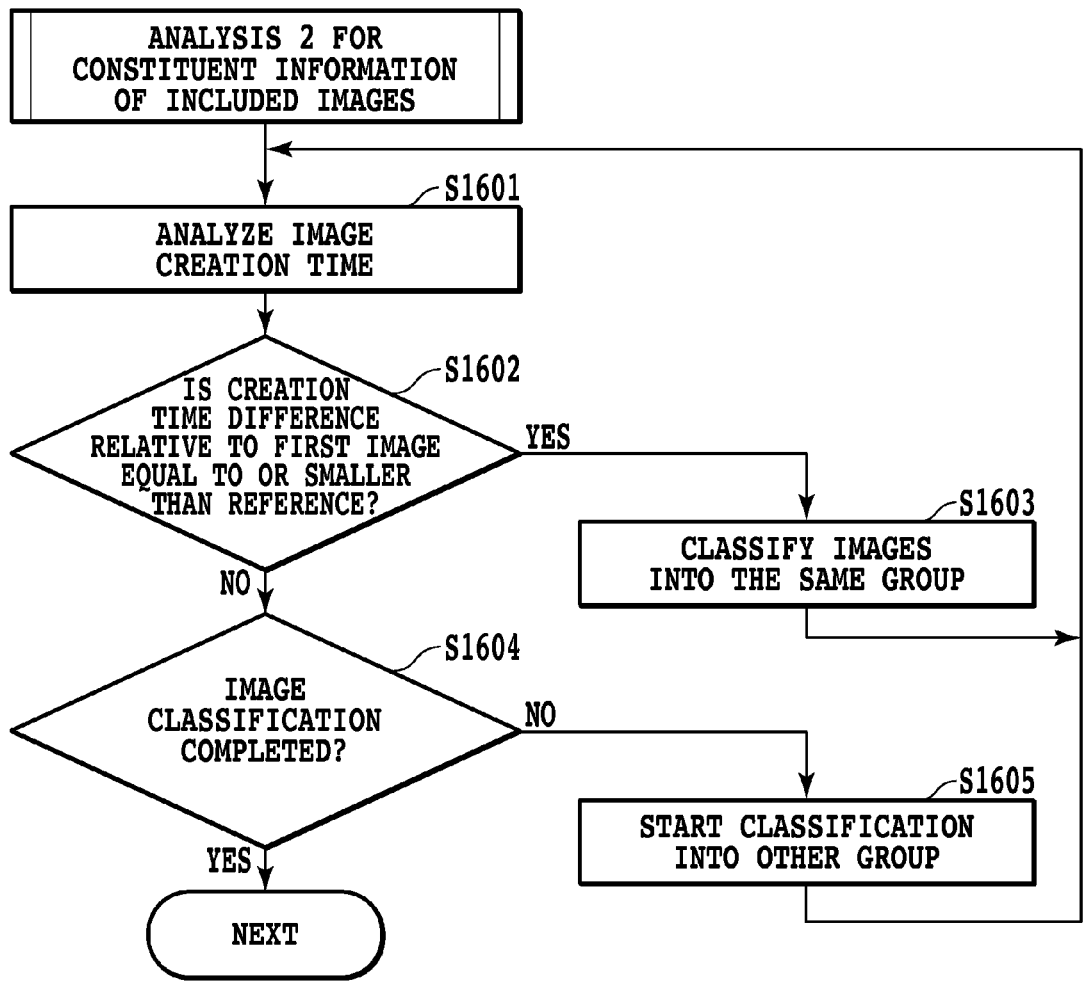
FIG. 37 is a flowchart showing the processing performed for third embodiments of the present invention.

Sequentially, in "Analysis 2 for the constituent information of the included images" in FIG. 37, the sub-images are divided into groups. At step S1601, the time that each sub-image was created (each shot was taken) is analyzed, and the creation time of the sub-image is compared with that of the first image. When the creation time difference is equal to or smaller than the reference time difference obtained at step S1502, at step S1603 the two images are classified as belonging to the same group, and program control returns to step S1601 to continue the analysis for the next sub-image. When the creation time difference is greater than the reference time difference, at step S1604 a check is performed to determine whether the image analysis process has been completed. Then, when the image analysis process has not yet been completed, it is ascertained that a different image group appears at the pertinent sub-image, and at step S1605, a new group is started, with this sub-image being regarded as the first image. In this manner, the images are divided into groups depending on the times created.

Figure 38:
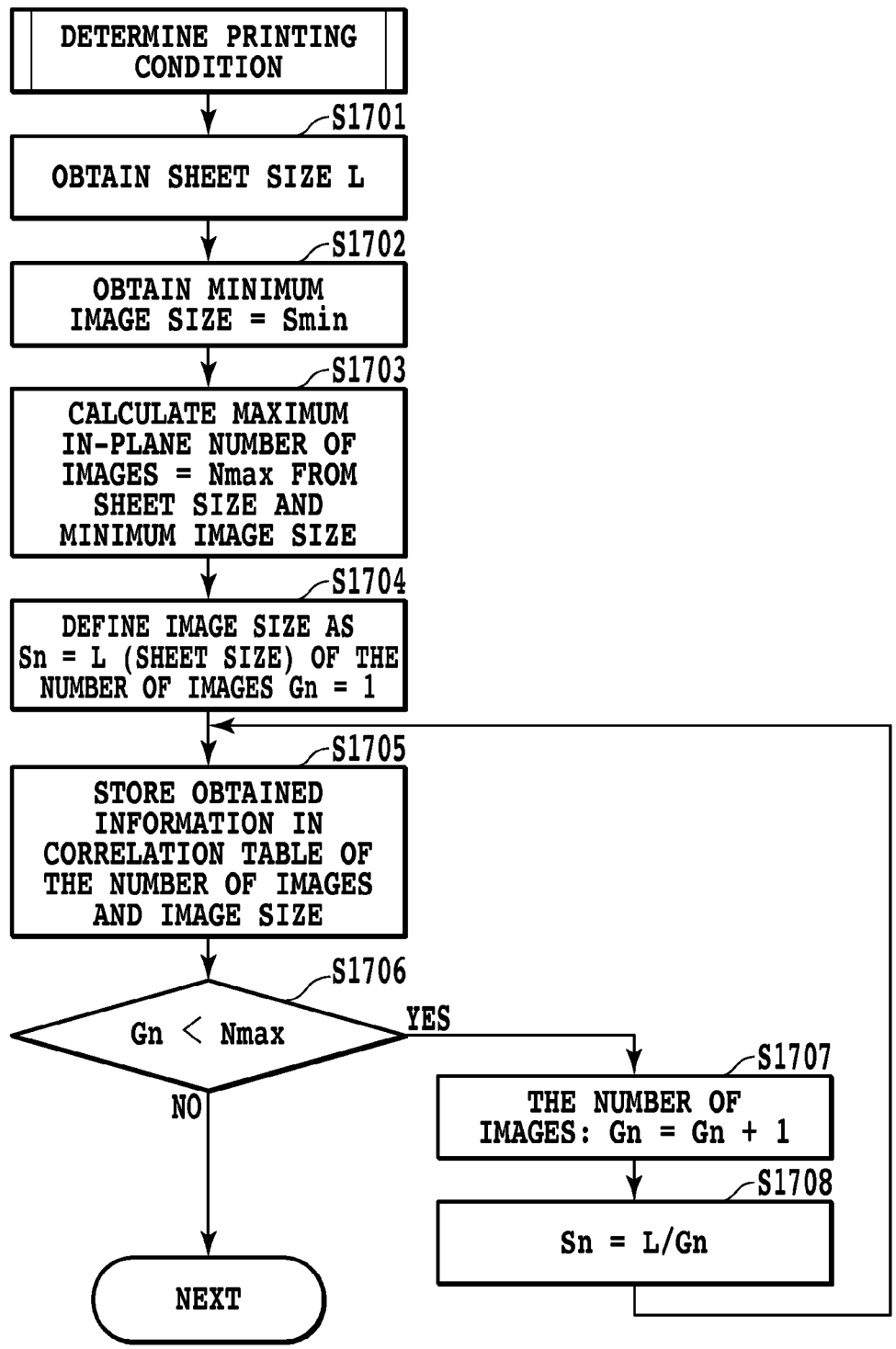
FIG. 38 is a flowchart showing the processing performed for third embodiments of the present invention.

Next, through the processing in FIG. 38, information are obtained indicating a correlation between the number of the images to be printed on a page and an image size that is generated as a printing condition. At step S1701, the size of sheets loaded in the image processing apparatus is obtained from the operating panel 601 in FIG. 14. Then, at step S1702, a minimum value (Smin) is obtained for the image size required for a case in which multiple images are to be printed on a page. The minimum image size may either be stored in advance in the data ROM 607, or in the internal storage unit 603 in FIG. 14, or may be designated by a user by employing the process previously described at step S301 in the first embodiment. At step S1703, the dimensions of a sheet size L are divided by the minimum image size Smin, to obtain a maximum number of images (Nmax) indicating the number of images to be printed on a page. At step S1703, the dimension of the sheet size L divided by the dimension of the minimum image size Smin may be determined as Nmax, and the length of the sheet size L divided by the length of the minimum image size Smin may be determined as Nmax. Further, the width of the sheet size L divided by the width of the minimum image size Smin may also be determined as Nmax.

At step S1704, the image size for a case in which the number of images of 1 (a single image) is defined in consonance with the sheet size L, and at step S1705, information is stored in a correlation table. From steps S1705 to S1708, an image size correlated with the number of images is calculated, and a correlation table for the two is prepared. So long as the decision at step S1706 is that the number of images is smaller than the maximum number of images to be printed, the process for preparing a correlation table is continued. At step S1707, the number of images is incremented, and at step S1708 a value obtained by dividing an image size S1 (=L) by the number of images Gn (the value obtained by division) is employed as an image size Sn that is correlated with the number of images Gn. This process is continued until a maximum number of images (Nmax) is reached. As a result, the image size Sn is obtained for the number of images of 1 through the maximum number of images (Nmax) of the images to be adhered to a plane. This information is stored in the correlation table explained at step S1705. The correlation table is prepared either in the data ROM 607 or in the internal storage unit 603 in FIG. 14.

The output range and the output form for the images to be actually output are determined during the performance of the process in FIG. 39. The process in FIG. 39 corresponds to the processes performed at steps S108 and S109 in FIG. 1. At step S1801, the number of images N is obtained for the image file analyzed at step S1501, and at step S1802, the number of images N is compared with the maximum in-plane number of images (Nmax). When N is smaller than Nmax, it is assumed that all the images in the image file can be printed on one page, and at step S1803, the image size S, correlated with the number of images N, is obtained from the correlation table prepared at step S1705, and images reduced to the size S are output. An example for the printing of all the images on one page has been employed for this processing; however, an arbitrary number of pages may be employed for printing images, and the number of pages to be output may either be stored in advance in the data ROM 607, or in the internal storage unit 603 in FIG. 14, or may be designated by a user by performing the process described at step S301 in the first embodiment.

When the number of images N is greater than Nmax, at step S1805 and the following steps, a process for selecting images to be output is performed. At step S1805, whether multiple image groups are present is determined based on the group information that is obtained through the analysis performed at steps S1601 to S1605. When multiple image groups are not present, at step S1810 images are reduced to the minimum image size Smin and are output in accordance with the number of images N that does not exceed the maximum in-plane number of images Nmax. In this case, the maximum number of images, beginning with the first image, is regarded as the number of those to be output. However, an arbitrary method may be employed for determining which images are to be output.

When it is determined that there are multiple image groups at step S1805, the processing is moved to step S1806. The number of images Ng of each image group is obtained at step S1806, and at step S1807 the image size correlated with the number of images Ng is obtained from the correlation table. In this case, only the first image for each group is to be output. However, an arbitrary number of images may be output for each group, and arbitrary images may be designated. Further, only one image group may be output. At step S1808, main images (the first images) of the individual groups are designated, and at step S1809 the main images (the first images) of the individual groups are reduced to the obtained size S and output.

Since the above described methods are employed, image data of a multi-image format file can be analyzed to obtain the number of images and the other image information included in the file, and the output range and the output form for the images can be automatically determined.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-100190, filed Apr. 16, 2009, 2010-090410, filed Apr. 9, 2010 which are hereby incorporated by reference herein in their entirety.

What is claimed is:

1. An image processing apparatus, comprising:
an input unit for inputting a plurality of image data obtained by continuously shooting under multiple different shooting conditions;
a determination unit for determining whether a number of images of the plurality of image data is greater than a reference number; and
an output unit for outputting any one of the plurality of image data in a case where it is determined as a result of the determination unit that the number of images of the plurality of image data is greater than the reference number, and for outputting the plurality of image data in a case where it is determined by the determination unit that the number of images of the plurality of image data is equal to or smaller than the reference number,
wherein the reference number of images is greater than one.

2. An image processing method, comprising:
an input step of inputting a plurality of image data obtained by continuously shooting under multiple different shooting conditions consisting of main image and sub image;
a determination step of determining whether a number of images of the plurality of image data is greater than a reference number; and
an output step of outputting any one of the plurality of image data in a case where it is determined as a result of the determination step that the number of images of the plurality of image data is greater than the reference number, and of outputting the plurality of image data in a case where it is determined as a result of the determination step that the number of images of the plurality of image data is equal to or smaller than the reference number, wherein
at least one of said steps is conducted by a microprocessor,
wherein the reference number of images is greater than one.

3. An image processing apparatus according to claim 1, wherein the shooting under the multiple different shooting conditions is shooting with varying exposure amounts.

4. An image processing apparatus according to claim 1, wherein the shooting under the multiple different shooting conditions is bracket shooting.

* * * * *